(12) United States Patent
Kim et al.

(10) Patent No.: US 12,457,754 B2
(45) Date of Patent: Oct. 28, 2025

(54) NONVOLATILE MEMORY DEVICE AND OPERATING METHOD OF THE SAME

(71) Applicant: Samsung Electronics Co., Ltd., Suwon-si (KR)

(72) Inventors: Yumin Kim, Suwon-si (KR); Jooheon Kang, Suwon-si (KR); Sunho Kim, Suwon-si (KR); Seyun Kim, Suwon-si (KR); Garam Park, Suwon-si (KR); Hyunjae Song, Suwon-si (KR); Dongho Ahn, Suwon-si (KR); Seungyeul Yang, Suwon-si (KR); Myunghun Woo, Suwon-si (KR); Jinwoo Lee, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 140 days.

(21) Appl. No.: 18/169,436

(22) Filed: Feb. 15, 2023

(65) Prior Publication Data

US 2024/0065000 A1 Feb. 22, 2024

(30) Foreign Application Priority Data

Aug. 16, 2022 (KR) .................. 10-2022-0102228

(51) Int. Cl.
*H10B 63/00* (2023.01)
*G06N 3/063* (2023.01)
*G11C 13/00* (2006.01)

(52) U.S. Cl.
CPC ............ *H10B 63/34* (2023.02); *G06N 3/063* (2013.01); *G11C 13/0007* (2013.01);
(Continued)

(58) Field of Classification Search
CPC ...... H10B 63/34; H10B 63/845; H10B 63/84; H10B 63/30; G06N 3/063; G11C 13/0007;
(Continued)

(56) References Cited

U.S. PATENT DOCUMENTS 8,427,865 B2 4/2013 Shima et al.
8,829,590 B2 9/2014 Park
(Continued)

FOREIGN PATENT DOCUMENTS

KR 10-2021-0107304 A 9/2021
KR 10-2022-0005815 A 1/2022

OTHER PUBLICATIONS

Extended European Search Report dated Jan. 17, 2024 for corresponding European Patent Application No. 23157812.1.
(Continued)

*Primary Examiner* — Amir Zarabian
*Assistant Examiner* — Bradley S Coon
(74) *Attorney, Agent, or Firm* — HARNESS, DICKEY & PIERCE, P.L.C.

(57) ABSTRACT

Provided are a nonvolatile memory device and an operating method thereof. The nonvolatile memory device may include a conductive pillar, a resistance change layer surrounding a side surface of the conductive pillar, a semiconductor layer surrounding a side surface of the resistance change layer, a gate insulating layer surrounding a side surface of the semiconductor layer, and a plurality of insulating patterns and a plurality of gate electrodes alternately arranged along a surface of the gate insulating layer. The plurality of insulating patterns and the plurality of gate electrodes may surround a side surface of the gate insulating layer.

20 Claims, 22 Drawing Sheets

(52) U.S. Cl.
CPC ......... *G11C 13/003* (2013.01); *H10B 63/845* (2023.02); *G11C 2213/71* (2013.01); *G11C 2213/75* (2013.01); *G11C 2213/79* (2013.01)

(58) Field of Classification Search
CPC .............. G11C 13/003; G11C 2213/71; G11C 2213/75; G11C 2213/79; G11C 13/0011; G11C 13/0038; H10N 70/826; H10N 70/8265; H10N 70/24; H10N 70/8833
See application file for complete search history.

(56) References Cited

U.S. PATENT DOCUMENTS

| | | | |
|---|---|---|---|
| 9,093,369 | B2 | 7/2015 | Shin et al. |
| 9,947,685 | B2 | 4/2018 | Fujii et al. |
| 9,966,136 | B2 | 5/2018 | Ogiwara et al. |
| 2014/0301128 | A1* | 10/2014 | Park ........................ H10N 70/20 257/4 |
| 2014/0321193 | A1* | 10/2014 | Park ................... G11C 13/0004 257/295 |
| 2020/0266345 | A1 | 8/2020 | Yoon et al. |
| 2021/0035635 | A1 | 2/2021 | Yoon et al. |
| 2021/0035641 | A1 | 2/2021 | Yoon et al. |
| 2021/0202833 | A1 | 7/2021 | Kim et al. |
| 2021/0202840 | A1 | 7/2021 | Kim et al. |
| 2021/0217473 | A1 | 7/2021 | Cho et al. |
| 2021/0265565 | A1 | 8/2021 | Hayakawa et al. |
| 2021/0384258 | A1 | 12/2021 | Hwang |
| 2022/0020437 | A1 | 1/2022 | Kim et al. |
| 2022/0020818 | A1 | 1/2022 | Kim et al. |
| 2022/0052259 | A1 | 2/2022 | Kim et al. |
| 2022/0077235 | A1 | 3/2022 | Kim et al. |
| 2022/0190031 | A1 | 6/2022 | Tortorelli et al. |
| 2022/0246679 | A1 | 8/2022 | Cho et al. |
| 2022/0302380 | A1 | 9/2022 | Mizusaki et al. |
| 2022/0310827 | A1 | 9/2022 | Kim et al. |
| 2023/0093892 | A1 | 3/2023 | Kim et al. |
| 2023/0121581 | A1 | 4/2023 | Kim et al. |

OTHER PUBLICATIONS

Wang, Q. et al., "Oxygen vacancy drift controlled three-terminal ReRAM with a reduction in operating gate bias and gate leakage current," Solid State Ionics, 2018, 328, 30-34.

Chuljun Lee et al., "Excellent Synapse Characteristics of 50 nm Vertical Transistor with WOx channel for High Density Neuromorphic system," 2021 Symposium on VLSI Technology.

Elia Ambrosi et al., "Impact of oxide and electrode materials on the switching characteristics of oxide ReRAM devices," Faraday Discussions, 2019, 213, 87.

* cited by examiner

NONVOLATILE MEMORY DEVICE AND OPERATING METHOD OF THE SAME

CROSS-REFERENCE TO RELATED APPLICATION

This application is based on and claims priority under 35 U.S.C. § 119 to Korean Patent Application No. 10-2022-0102228, filed on Aug. 16, 2022 in the Korean Intellectual Property Office, the disclosure of which is incorporated by reference herein in its entirety.

BACKGROUND

1. Field

The present disclosure relates to a nonvolatile memory device and an operating method thereof.

2. Description of the Related Art

As a semiconductor memory device, a nonvolatile memory device maintains information even when the power is turned off, and includes a number of memory cells that may use the stored information again when the power is turned on. Nonvolatile memory devices may be used in mobile phones, digital cameras, portable digital assistants (PDAs), mobile computer devices, fixed computer devices, and other devices.

Research is underway on the use of three-dimensional (or vertical) NAND (VNAND) on next-generation neuromorphic computing platforms or chips to form a neural network.

SUMMARY

Provided are a nonvolatile memory device including a conductive pillar and an operating method of the same.

Provided are a nonvolatile memory device capable of applying a voltage having a small intensity to a semiconductor layer and an operating method of the same.

Additional aspects will be set forth in part in the description which follows and, in part, will be apparent from the description, or may be learned by practice of the presented embodiments of the disclosure.

According to an embodiment, a nonvolatile memory device may include a conductive pillar, a resistance change layer surrounding a side surface of the conductive pillar, a semiconductor layer surrounding a side surface of the resistance change layer, a gate insulating layer surrounding a side surface of the semiconductor layer, a plurality of insulating patterns and a plurality of gate electrodes, a first bit line, and a second bit line. The plurality of insulating patterns and the plurality of gate electrodes may be alternately arranged along a surface of the gate insulating layer. The plurality of insulating patterns and the plurality of gate electrodes may surround a side surface of the gate insulating layer. The first bit line may be electrically connected to the conductive pillar. The first bit line may be configured to provide a first voltage to the conductive pillar. The second bit line may be electrically insulated from the first bit line. The second bit line may be electrically connected to the semiconductor layer and the second bit line may be configured to provide a second voltage to the semiconductor layer.

In some embodiments, the first voltage and the second voltage may be different from each other.

In some embodiments, the first voltage may be greater than the second voltage.

In some embodiments, a difference between the first voltage and the second voltage may be less than an absolute value of the second voltage.

In some embodiments, the absolute value of the second voltage may be 5 V or less.

In some embodiments, the nonvolatile memory device may further include a controller. The controller may be configured to apply a turn-off voltage to a gate electrode corresponding to a selection memory cell among the plurality of gate electrodes, and the controller may be configured to apply a turn-on voltage to a gate electrode corresponding to a non-selection memory cell among the plurality of gate electrodes.

In some embodiments, the turn-off voltage may be less than at least one of the first voltage and the second voltage.

In some embodiments, the turn-on voltage may be greater than at least one of the first voltage and the second voltage.

In some embodiments, a difference between the first voltage and the second voltage may be less than a difference between the turn-on voltage and the turn-off voltage.

In some embodiments, all regions of the conductive pillar may be spatially spaced apart from all regions of the semiconductor layer.

In some embodiments, the nonvolatile memory device may further include an insulating layer between the resistance change layer and the conductive pillar.

In some embodiments, the insulating layer may include silicon oxide.

In some embodiments, the nonvolatile memory device may further include an insulating layer in the conductive pillar.

In some embodiments, the insulating layer in the conductive pillar may contact the resistance change layer.

Meanwhile, according to an embodiment, an operating method of a nonvolatile memory device is provided. The nonvolatile memory device may include a conductive pillar and a memory cell array sequentially arranged along a side of the conductive pillar. The operating method may include applying a turn-off voltage to a selection memory cell in the memory cell array; applying a turn-on voltage to a non-selection memory cell in the memory cell array; and, during an operation on the selection memory cell, applying a first voltage to the conductive pillar and a second voltage to the memory cell array. The second voltage may be different from the first voltage.

In some embodiments, the first voltage may be greater than the second voltage.

In some embodiments, a difference between the first voltage and the second voltage may be less than an absolute value of the second voltage.

In some embodiments, the absolute value of the second voltage may be 5 V or less.

In some embodiments, the turn-off voltage may be less than at least one of the first voltage and the second voltage.

In some embodiments, the turn-on voltage may be greater than at least one of the first voltage and the second voltage.

In some embodiments, a difference between the first voltage and the second voltage may be less than a difference between the turn-on voltage and the turn-off voltage.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
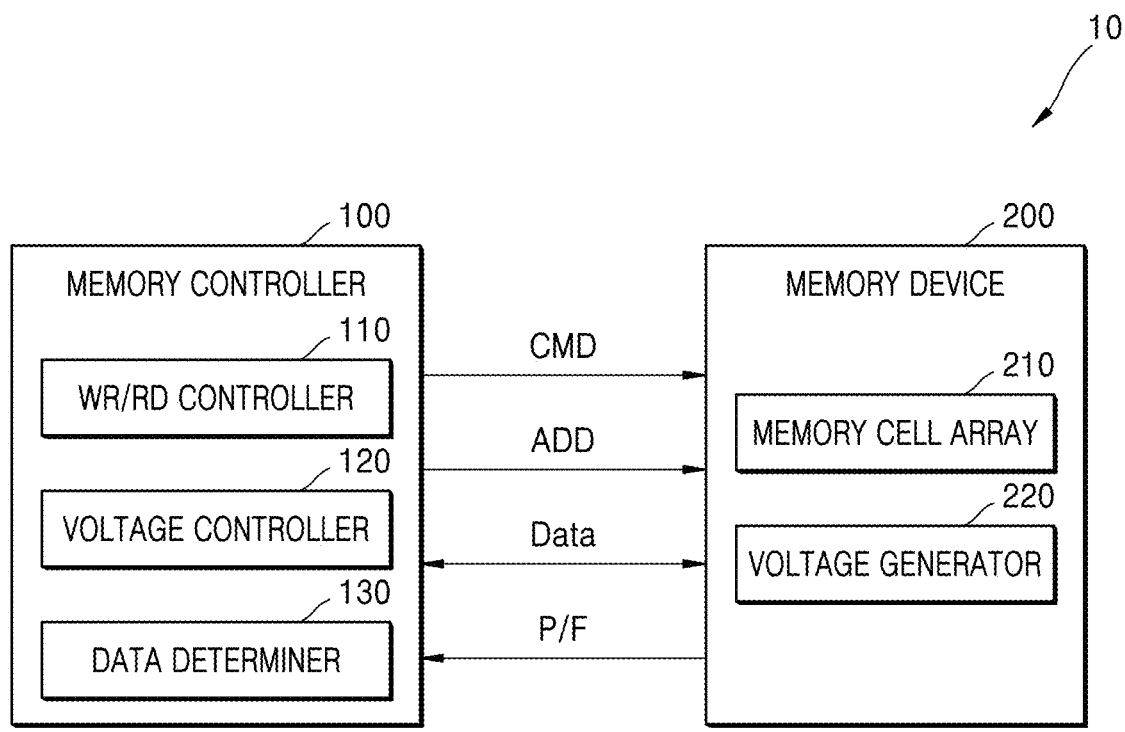
FIG. 1 is a block diagram illustrating a memory system according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list. For example, "at least one of A, B, and C," and similar language (e.g., "at least one selected from the group consisting of A, B, and C") may be construed as A only, B only, C only, or any combination of two or more of A, B, and C, such as, for instance, ABC, AB, BC, and AC.

When the terms "about" or "substantially" are used in this specification in connection with a numerical value, it is intended that the associated numerical value includes a manufacturing or operational tolerance (e.g., ±10%) around the stated numerical value. Moreover, when the words "generally" and "substantially" are used in connection with geometric shapes, it is intended that precision of the geometric shape is not required but that latitude for the shape is within the scope of the disclosure. Further, regardless of whether numerical values or shapes are modified as "about" or "substantially," it will be understood that these values and shapes should be construed as including a manufacturing or operational tolerance (e.g., ±10%) around the stated numerical values or shapes. When ranges are specified, the range includes all values therebetween such as increments of 0.1%.

In the disclosure, terms, such as "in some embodiments" or "in one embodiment" appearing in various places do not necessarily refer to the same embodiment.

Some embodiments of the disclosure may be represented by functional block configurations and various processing steps. Some or all of these functional blocks may be implemented with various numbers of hardware and/or software configurations that execute specific functions. For example, functional blocks of the disclosure may be implemented by a microprocessor or may be implemented by circuit configurations for certain functions. Functional blocks of the disclosure may be implemented in various programming or scripting languages. Functional blocks may be implemented by an algorithm executed by a processor. In addition, the disclosure may employ the prior art for electronic environment setting, signal processing, and/or data processing. Terms, such as "mechanism", "element", "means" and "configuration" may be widely used and are not limited to mechanical and physical configurations.

In addition, connection lines or connection members between components shown in the drawings are merely illustrative of functional connections and/or physical or circuit connections. In an actual device, connections between components may be represented by various functional connections, physical connections, or circuit connections that are replaceable or added.

Terms, such as "include" or "comprise" used in the disclosure should not be construed as necessarily including all of various components or steps described in the disclosure, and it should be understood that some of the components or some steps may not be included, or may further include additional components or steps.

Hereinafter, the term "upper portion" or "on" may also include "to be present above, below, or in the left or right on a non-contact basis" as well as "to be on the top portion, the bottom portion, or in the left or right in directly contact with". Hereinafter, only example embodiments will be described in detail with reference to the accompanying drawings.

The terms first, second, etc. may be used to describe various components, but the components should not be limited by terms. The terms are used only for the purpose of distinguishing one component from other components.

Hereinafter, the disclosure will be described in detail with reference to the accompanying drawings.

FIG. 1 is a block diagram illustrating a memory system according to an embodiment.

Referring to FIG. 1, the memory system 10 may include a memory controller 100 and a memory device 200. The memory controller 100 performs a control operation on the memory device 200, and for example, the memory controller 100 may perform a write (or read) operation on the memory device 200 by providing an address ADD and a command CMD to the memory device 200. In addition, data for a write operation and read data may be transmitted and received between the memory controller 100 and the memory device 200. The memory device 200 may provide a pass/fail signal P/F to the memory controller 100 according to a result of reading read data.

The memory device 200 may include a memory cell array 210 and a voltage generator 220 (e.g., power circuitry). The memory cell array 210 may include a plurality of memory cells arranged in regions where a plurality of word lines and a plurality of bit lines cross each other. The memory cell array 210 may include nonvolatile memory cells that store data so as to be nonvolatile, and as nonvolatile memory cells, the memory cell array 210 may include flash memory cells, such as a NAND flash memory cell array or a NOR flash memory cell array. Hereinafter, the embodiments of the disclosure will be described in detail assuming that the memory cell array 210 includes the flash memory cell array, and thus the memory device 200 is a nonvolatile memory device.

The memory controller 100 may include a write/read (WR/RD) controller 110, a voltage controller 120, and a data determiner 130.

The write/read control unit 110 may generate an address ADD and a command CMD for performing write/read and erase operations on the memory cell array 210. In addition, the voltage controller 120 may generate a voltage control signal for controlling a voltage level used in the nonvolatile memory device 200. For example, the voltage controller 120 may generate a voltage control signal for controlling a voltage level of a word line in order to read data from the memory cell array 210 or write data to the memory cell array 210.

Meanwhile, the data determiner 130 may perform a determination operation on data read from the memory device 200. For example, the number of on-cells and/or off-cells among memory cells may be determined by determining data read from the memory cells. As an operation example, when writing is performed on a plurality of memory cells, it may be determined whether a write operation is normally completed for all cells by determining a state of data of the memory cells using a predetermined read voltage.

Meanwhile, the memory device 200 may include the memory cell array 210 and a voltage generator 220. As described above, the memory cell array 210 may include nonvolatile memory cells, and for example, the memory cell array 210 may include flash memory cells. In addition, flash memory cells may be implemented in various forms, for example, the memory cell array 210 may include three-dimensional (or vertical) NAND (VNAND) memory cells.

Figure 2:
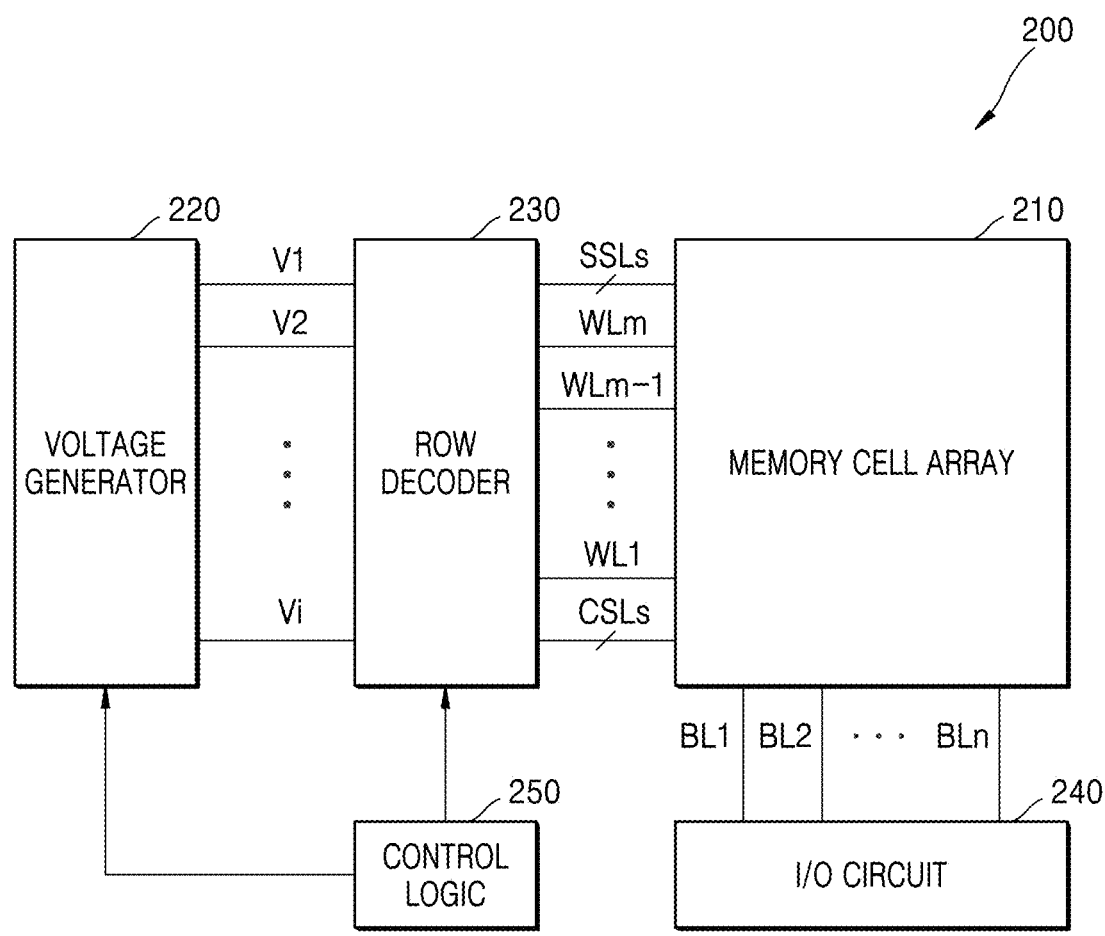
FIG. 2 is a block diagram illustrating an embodiment of a memory device according to FIG. 1.

FIG. 2 is a block diagram illustrating an embodiment of a memory device according to FIG. 1.

As illustrated in FIG. 2, the memory device 200 may further include a row decoder 230 and a control logic 250, in addition to a voltage generator 220.

The memory cell array 210 may be connected to string selection lines SSL, a plurality of word lines WL1 to WLm, which include normal word lines and dummy word lines, and common source lines CSLs, and may also be connected to a plurality of bit lines BL1 to BLn.

The voltage generator 220 may generate word line voltages V1 to Vi, and the word line voltages V1 to Vi may be provided to the row decoder 230. A signal for a write/read/erase operation may be applied to the memory cell array 210 through bit lines from an input/output (I/O) 620 circuit 240.

In addition, data to be written may be provided to the memory cell array 210 through the I/O circuit 240, and read data may be provided to the outside (e.g., the memory controller 100 in FIG. 1) through the I/O circuit 240. The control logic 250 may provide various control signals related to memory operation to the row decoder 230 and the voltage generator 220 under the control of the memory controller 100.

According to the decoding operation of the row decoder 230, word line voltages V1 to Vi may be provided to various lines SSLs, WL1 to WLm, and CSLs. For example, the word line voltages V1 to Vi may include string selection voltages, word line voltages, and ground selection voltages, and string selection voltages may be provided to the string selection lines SSLs, word line voltages may be provided to the word lines WLs, and ground selection voltages may be provided to the common source lines CSLs.

Figure 3:
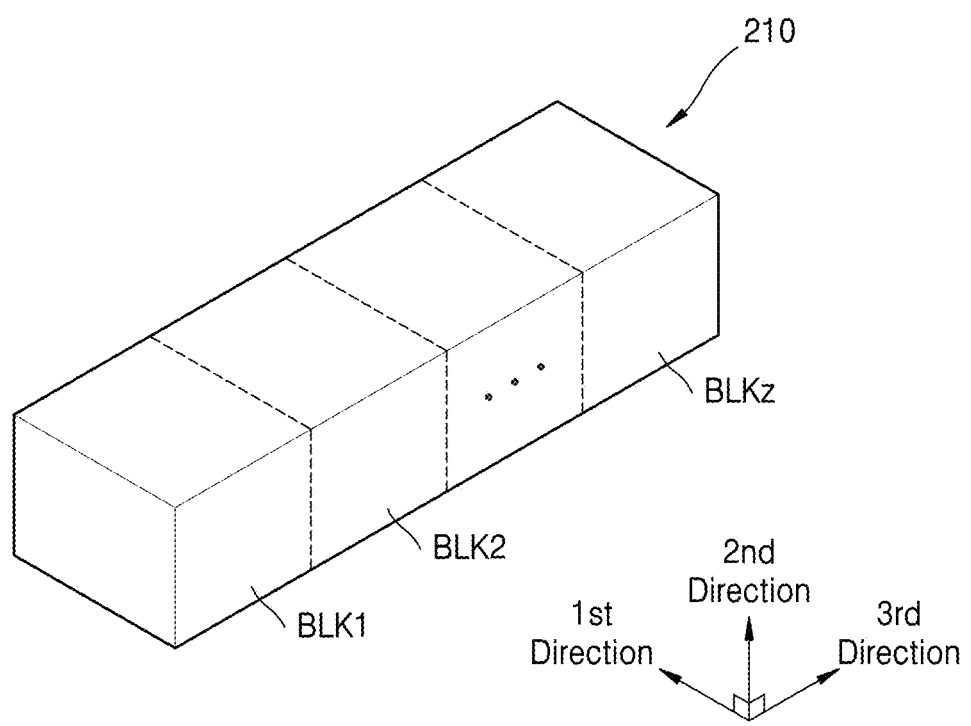
FIG. 3 is a perspective view illustrating a memory cell array according to FIG. 1.

FIG. 3 is a perspective view illustrating a memory cell array 210 according to FIG. 1.

Referring to FIG. 3, the memory cell array 210 includes a plurality of memory blocks BLK1 to BLKz. Each memory block BLK has a three-dimensional structure (or a vertical structure). For example, each memory block BLK includes structures extending along first to third directions.

Each cell string CS is connected to a bit line BL, a string selection line SSL, word lines WLs, and a common source line CSL That is, referring to FIGS. 1 to 3, the memory blocks BLK1 to BLKz may be connected to a plurality of bit lines BLs a plurality of string selection lines SSLs, a plurality of word lines WLs, and a plurality of common source lines CSLs, respectively.

Figure 4:
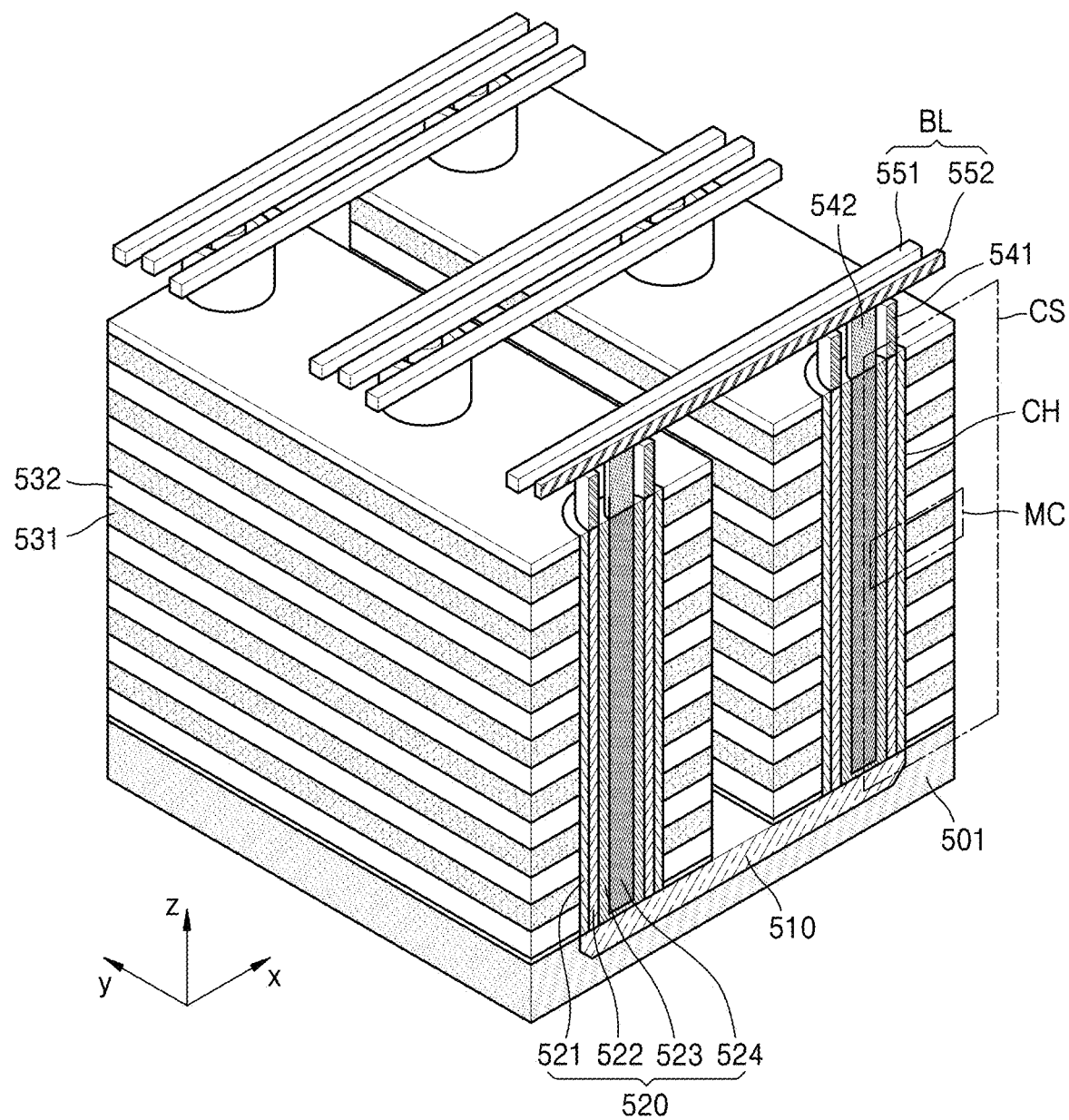
FIG. 4 is a perspective view illustrating a physical structure corresponding to a memory block according to an embodiment.

FIG. 4 is a perspective view illustrating a physical structure corresponding to a memory block according to an embodiment.

Referring to FIG. 4, a substrate 501 is provided. The substrate 501 may include a silicon material doped with first type impurities. For example, the substrate 501 may include a silicon material doped with p-type impurities. Hereinafter, it is assumed that the substrate 501 is formed of p-type silicon. However, the substrate 501 is not limited to p-type silicon.

A common source region 510 is provided on the substrate 501. For example, the common source region 510 may have a second type different from that of the substrate 501. For example, the common source region 510 may have an n-type. Hereinafter, it is assumed that the common source region 510 is n-type. However, the common source region 510 is not limited to an n-type.

A plurality of gate electrodes 531 and a plurality of insulating elements 532 may be alternately arranged on the substrate 501. The plurality of gate electrodes 531 and the plurality of insulating patterns 532 may be sequentially stacked while crossing in a thickness direction of the substrate 501. The plurality of gate electrodes 531 may include, for example, a metal material (e.g., copper, silver, etc.), and the plurality of insulating patterns 532 may include silicon oxide, but are not limited thereto. Each gate electrode 531 is connected to one of the word line WL and the string selection line SSL.

A channel structure 520 vertically penetrating the plurality of gate electrodes 531 and the plurality of insulating patterns 532 is provided. The channel structure 520 may extend through a channel hole CH defined by the plurality of gate electrodes 531 and the plurality of insulating patterns 532. The channel hole CH may extend vertical to an upper surface of the substrate 501.

The channel structure (pillar) 520 may include a plurality of layers. In an embodiment, the outermost layer of the channel structure 520 may be a gate insulating layer 521. For example, the gate insulating layer 521 may include silicon oxide. The gate insulating layer 521 may be conformally deposited on the channel structure 520. The gate insulating layer 521 may have a thickness of about 1 nm to about 15 nm.

In addition, a semiconductor layer 522 may be conformally deposited along an inner side surface of the gate insulating layer 521. In an embodiment, the semiconductor layer 522 may include a silicon material. Alternatively, the semiconductor layer 522 may also include a material, such as Ge, IGZO, GaAs, or the like. The semiconductor layer 522 may not be doped with a dopant. The Fermi level of the semiconductor layer 522 may be changed according to a voltage applied to the gate electrode 531. However, embodiments are not limited thereto. The semiconductor layer 522 may include a silicon material doped with a first type. The semiconductor layer 522 may include a silicon material doped in the same type as the substrate 501, and for example, when the substrate 501 includes a p-type-doped silicon material, the semiconductor layer 522 may also include a p-type-doped silicon material. The semiconductor layer 522 may have a thickness of about 1 nm to about 15 nm.

A resistance change layer 523 may be arranged along an inner side surface of the semiconductor layer 522. The resistance change layer 523 may be conformally deposited on the semiconductor layer 522. In an embodiment, the resistance change layer 523 may be formed of a material whose resistance varies according to an applied voltage. The resistance change layer 523 may change from a high resistance state to a low resistance state or from a low resistance state to a high resistance state according to a voltage applied to the gate electrode 531. The resistance change may be a phenomenon caused by oxygen vacancies of the resistance change layer 523.

The resistance change layer 523 may be formed of a material having hysteresis properties. For example, the resistance change layer 523 may include a transition metal oxide or a transition metal nitride. Specifically, the resistance change layer 523 may include an oxide or a nitride of at least one element selected from the group consisting of zinc (Zn), zirconium (Zr), hafnium (Hf), aluminum (Al), nickel (Ni), copper (Cu), molybdenum (Mo), tantalum (Ta), titanium (Ti), tungsten (W), chromium (Cr), strontium (Sr), lanthanum (La), manganese (Mn), calcium (Ca), and praseodymium (Pr). In addition, the resistance change layer 523 may include GeSbTe. The resistance change layer 523 may have a thickness of about 1 nm to about 15 nm.

A conductive pillar 524 may be arranged along an inner surface of the resistance change layer 523. The conductive pillar 524 may be in contact with the resistance change layer 523. The conductive pillar 524 may be conformally deposited on the resistance change layer 523. The conductive pillar 524 may be formed of a material having excellent electrical conductivity. For example, the conductive pillar 524 may include at least one of W, Ti, TiN, Ru, $RuO_2$, Ta, and TaN. The conductive pillar 524 may be formed of the same material as the gate electrode 531.

All regions of the conductive pillar 524 may be spatially spaced apart from all regions of the semiconductor layer 522 by the resistance change layer 523. Since the conductive pillar 524 and the semiconductor layer 522 are electrically insulated, voltages may be independently applied to the conductive pillar 524 and the semiconductor layer 522.

The semiconductor layer 522 and the resistance change layer 523 may be in contact with the common source region 510.

A first drain 541 may be provided on the first semiconductor layer 522, and a second drain 542 may be provided on the conductive pillar 524. The first drain 541 and the second drain 542 may be electrically insulated from each other. For example, the first drain 541 and the second drain 542 may be spatially spaced apart from each other, and air or an insulating material may be filled between the first drain 541 and the second drain 542.

At least one of the first drain 541 and the second drain 542 may include a silicon material doped with a second type. For example, the first drain 541 and the second drain 542 may include an n-type doped silicon material.

Figure 11A:
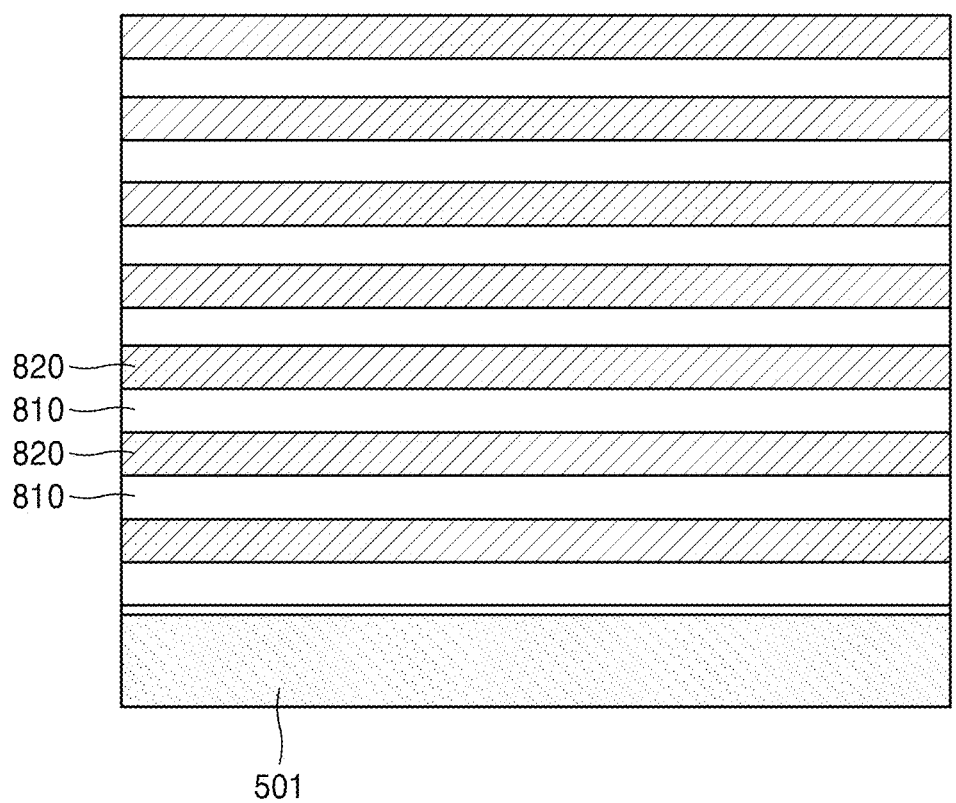
FIGS. 11A to 11G are reference views illustrating a method of manufacturing a nonvolatile memory device according to an embodiment.
Figure 11B:
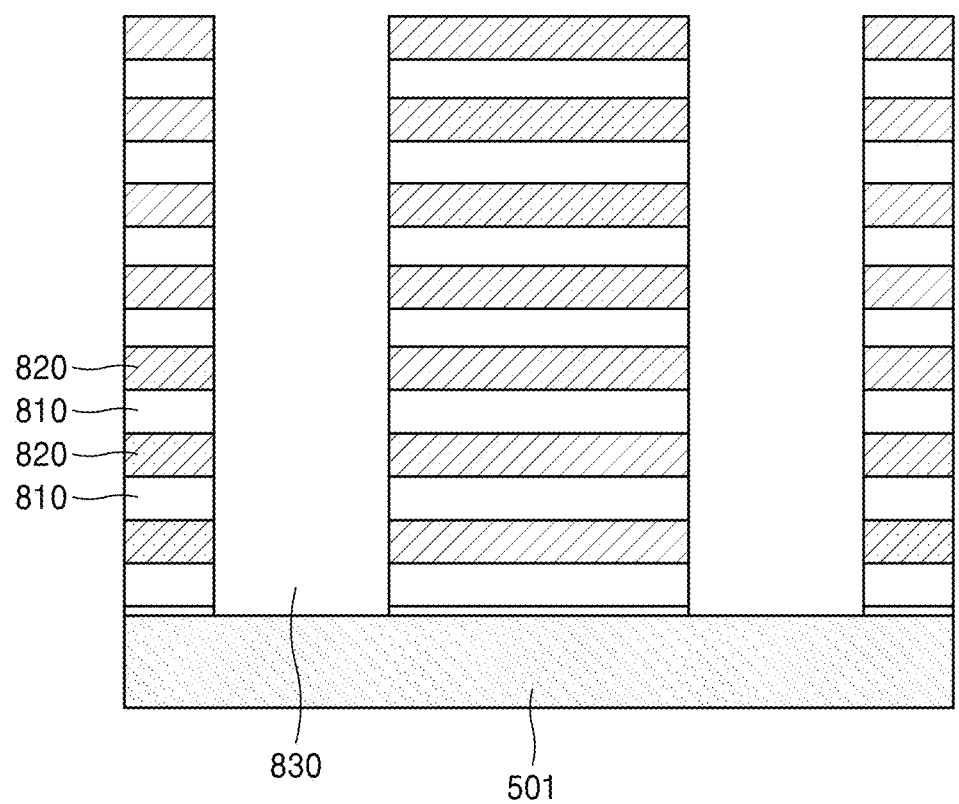
Figure 11C:
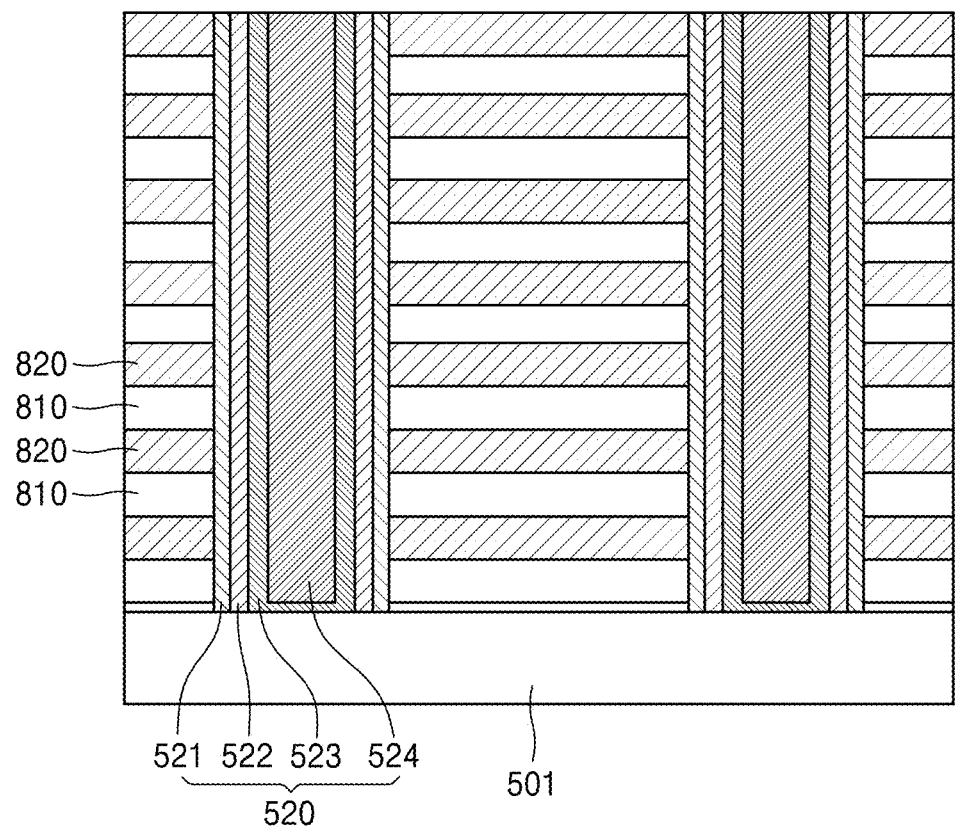
Figure 11D:
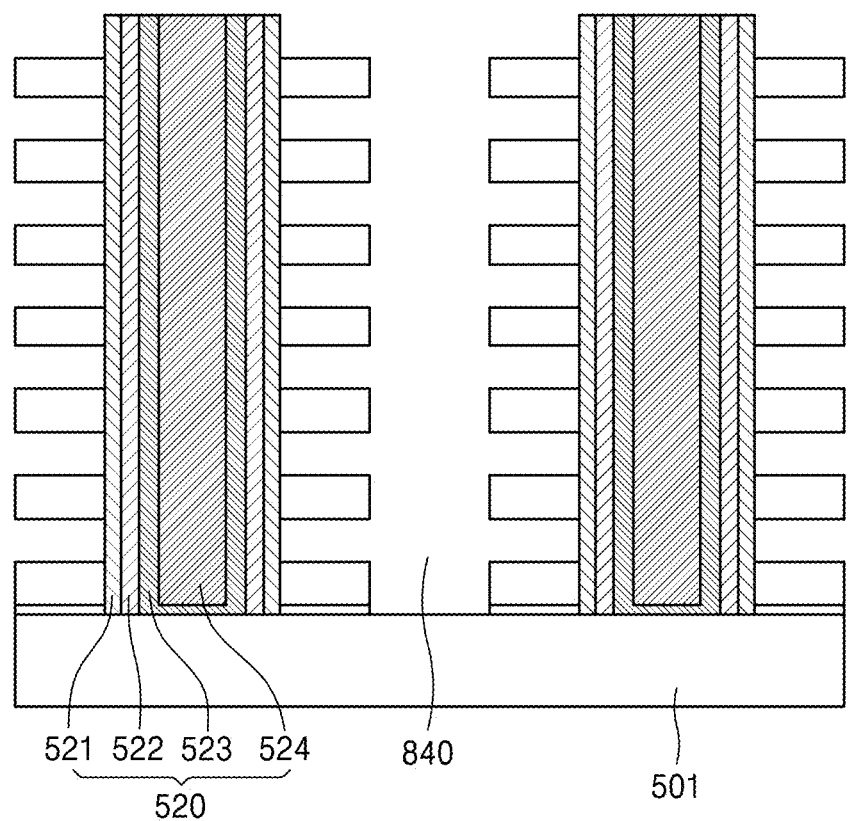
Figure 11E:
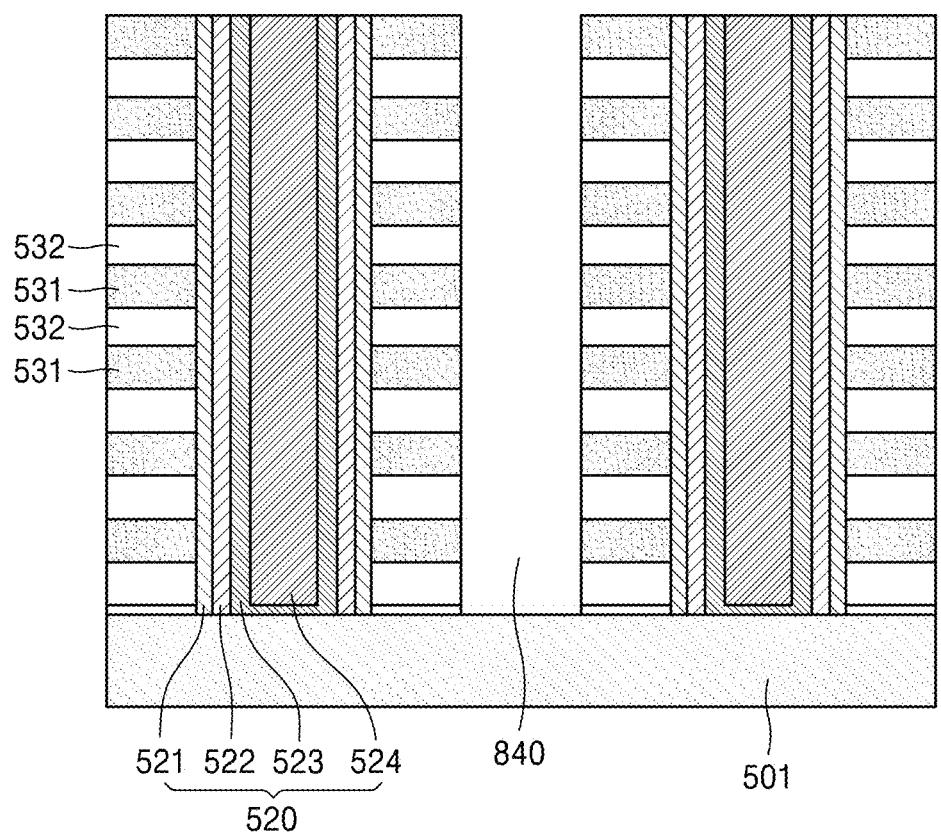
Figure 11F:
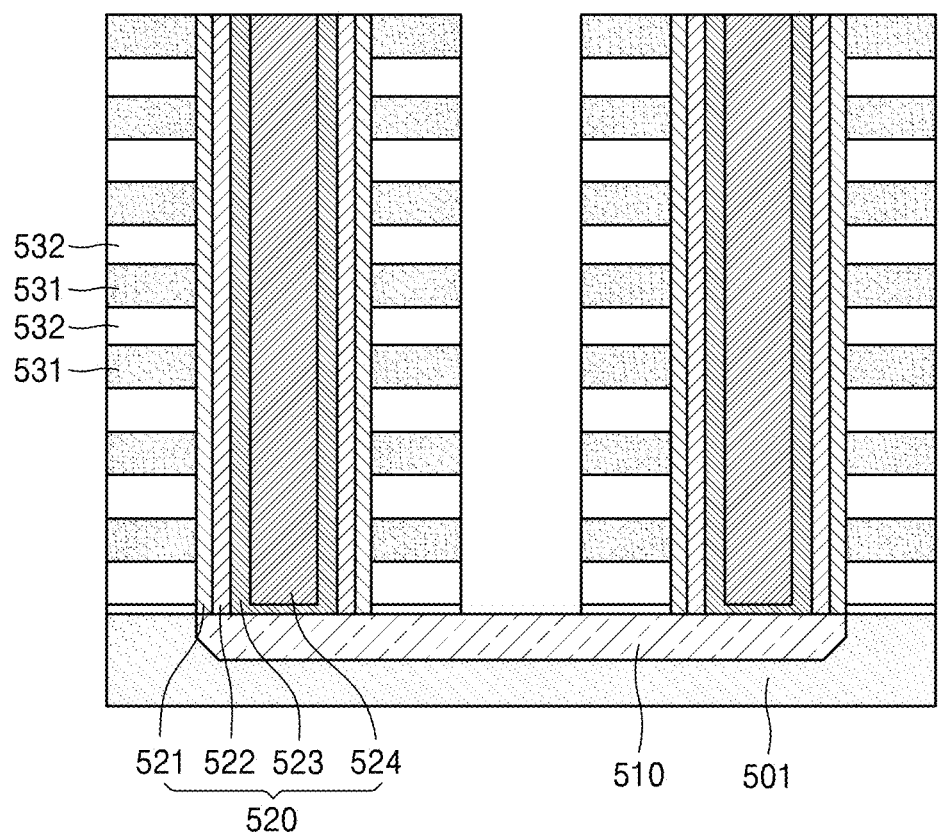
Figure 11G:
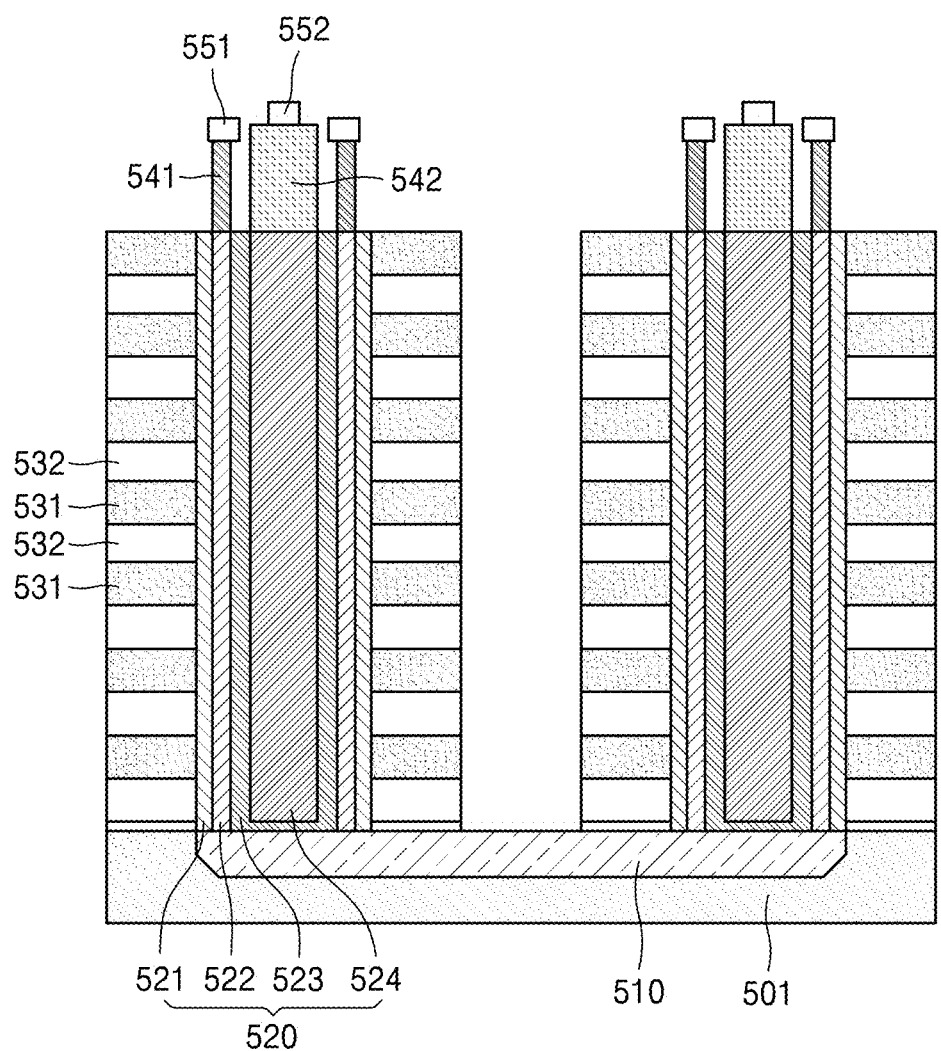

In memory devices according to some example embodiments, for example as shown in FIGS. 4 and 11G, a first bit line 551 may be electrically connected to the first drain 541, and a second bit line 552 may be electrically connected to the second drain 542. The first drain 541 and the first bit line 551 may be connected through a contact plug, and the second drain 542 and the second bit line 552 may be connected through a contact plug. The first bit line 551 and the second bit line 552 may include a metallic material. In one cell string, the first and second bit lines 551 and 552 may be one bit line BL as a set.

In other words, referring to FIGS. 4, 8, 9, 10, and 11G for example, the memory device in the form of a cell string according to an embodiment includes the conductive pillar 524, the resistance change layer 523 surrounding a side surface of the conductive pillar 524, the semiconductor layer 522 surrounding a side surface of the resistance change layer 523, the gate insulating layer 521 surrounding a side surface of the semiconductor layer 522, and the plurality of gate electrodes 531 and the plurality of insulating patterns 532, which are alternately arranged along a surface of the gate insulating layer 521, while surrounding a side surface of the gate insulating layer 521. In addition, the memory device may include the second bit line 552 that is electrically connected to the conductive pillar 524 to provide a voltage to the conductive pillar 524 and the first bit line 551 that is electrically connected to the semiconductor layer 522 while being insulated from the second bit line 552, to provide a voltage to the semiconductor layer 522.

The gate electrode 531, the gate insulating layer 521, and the semiconductor layer 522 may be certain components of a transistor, and the resistance change layer 523 may be a resistor. The semiconductor layer 522 and the resistance change layer 523 of the transistor may be directly bonded to each other, and the resistance change layer 523 may have a high resistance state or a low resistance state. In each memory cell MC, the semiconductor layer 522 and the resistance change layer 523 of a transistor are connected in parallel, and the parallel structure is continuously arranged in a vertical direction to form a cell string CS.

The common source line CSL, and the first and second bit lines 551 and 552 may be connected to both ends of the cell string CS, respectively. In addition, voltage is applied to the first and second bit lines 551 and 552, so that write, read, and erase operations may be performed on the plurality of memory cells MCs.

According to example embodiments of the present disclosure, instead of configuring the memory block using the phase change material, a memory block is configured using the resistance change layer 523, thereby reducing and/or solving heat generation and stress (pressure) problems caused by using the phase change material. In addition, as described above, even when memory cells included in a memory block are repeatedly operated by configuring a memory block and operating a memory block, it is possible to limit and/or prevent ion movement between adjacent memory cells and leakage current and operation failure due to the ion movement. In addition, the memory block according to the disclosure may solve the scaling issue between memory cells in the next-generation VNAND, thereby dramatically increasing the density.

Meanwhile, the memory block according to the disclosure may be implemented in the form of a chip and used as a neuromorphic computing platform. In addition, the block according to the disclosure may be implemented in a chip form to be used to configure a neural network.

The memory controller 100 may control the memory cell MC to operate as at least one of write, read, and erase. In other words, the memory controller 100 may control at least one of a write operation, a read operation, and an erase operation on the memory cell MC.

Figure 5:
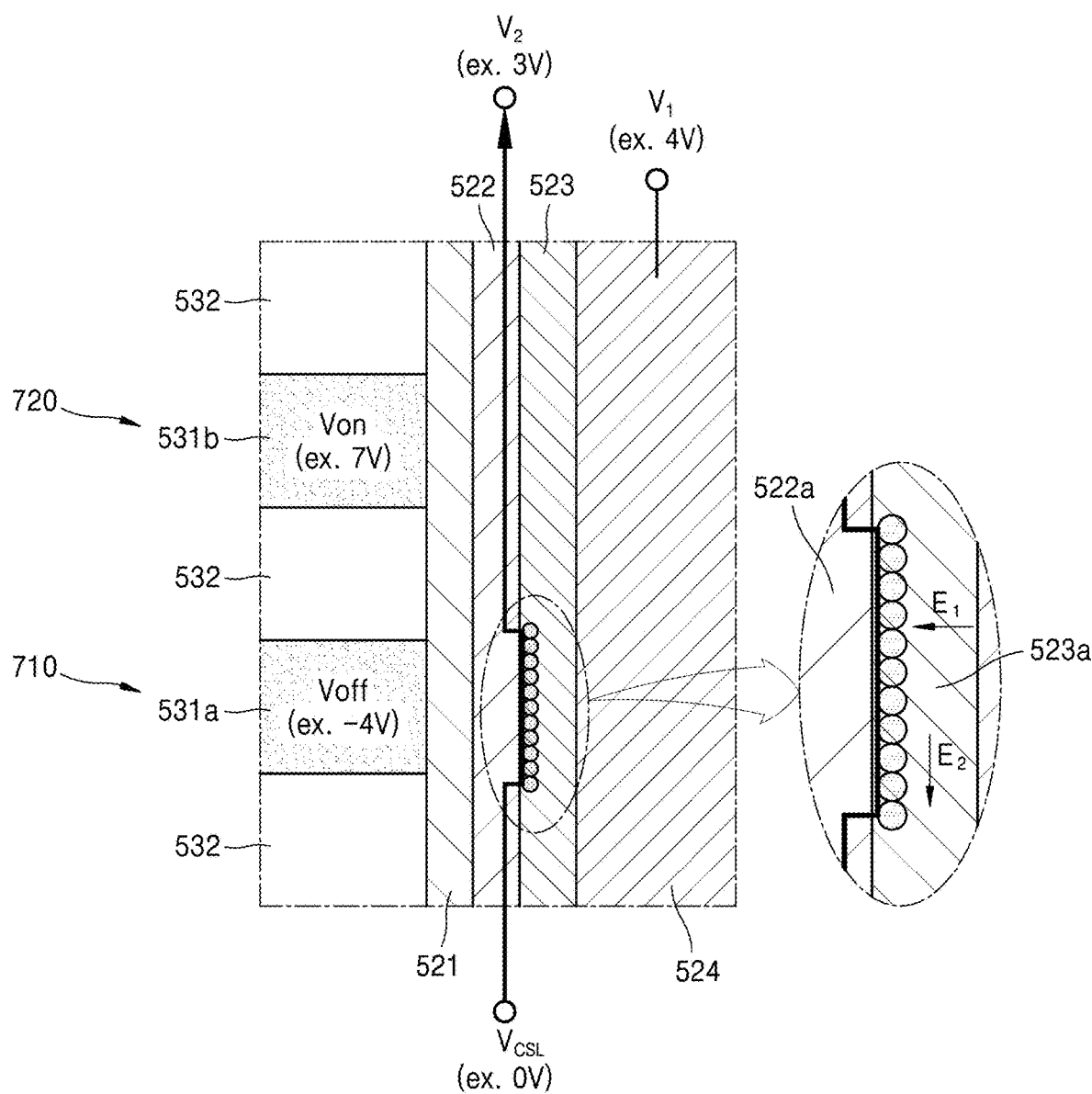
FIG. 5 is a diagram showing movement of oxygen vacancies in a resistance change layer during a write operation according to an embodiment.

FIG. 5 is a diagram related to movement of oxygen vacancies in a resistance change layer 523 during a write operation according to an embodiment.

As illustrated in FIG. 5, the gate electrodes 531 (e.g., 531a, 531b), the insulating patterns 532, the gate insulating layer 521, the semiconductor layer 522, the resistance change layer 523, and the conductive pillar 524 may be included on the substrate 501 (see FIG. 4 for substrate 501). The gate insulating layer 521, the semiconductor layer 522, the resistance change layer 523, and the conductive pillar 524 may extend in a first direction. The gate electrodes 531 and the insulating patterns 532 may alternately extend in a second direction perpendicular to the first direction. The first direction, second direction, and third direction may correspond to Y, X, and Z in FIG. 4.

Meanwhile, the gate electrode 531, the gate insulating layer 521, and the semiconductor layer 522 may be certain components of a transistor, and the resistance change layer 523 may correspond to a resistor.

The control logic 250 of FIG. 2 may control to apply a turn-off voltage Voff to the gate electrode 531a of a selection memory cell 710 and a turn-on voltage Von to the gate electrode 531b of a non-selection memory cell 720. The turn-off voltage Voff is a voltage that turns off the transistor and limits and/or prevents current from flowing through the semiconductor layer 522a of the transistor included in the selection memory cell 710. The turn-on voltage Von is a voltage that turns on the transistor and allows current to flow through the semiconductor layer 522 of the transistor included in the non-selection memory cell 720. Thus, the semiconductor layer 522a corresponding to the gate electrode 531a of the selection memory cell 710 may have insulation characteristics, and the semiconductor layer 522 corresponding to the gate electrode 531b of the non-selection memory cell 720 may have conductor characteristics.

The turn-off voltage Voff and the turn-on voltage Von may vary depending on the types and thicknesses of materials constituting the gate electrode 531, the gate insulating layer 521, the semiconductor layer 522, the resistance change layer 523, and the conductive pillar 524. For example, when the turn-off voltage Voff is a negative voltage, the turn-off voltage Voff may be −10 V or greater and −2 V or less. When the turn-on voltage Von is a positive voltage, the turn-on voltage Von may be 0 V or greater and 10 V or less. A turn-on voltage Von of the same value may be applied to the non-selection memory cell 720 or turn-on voltages Von of different values may be applied thereto.

During a write operation, the memory controller 100 may apply a first voltage $V_1$ to the conductive pillar 524 through the second bit line 552, and a second voltage $V_2$ to the semiconductor layer 522 through the first bit line 551. The memory controller 100 may sequentially apply the first voltage $V_1$ and the second voltage $V_2$ one after the other or simultaneously.

The first voltage $V_1$ and the second voltage $V_2$ may vary depending on the types and thicknesses of materials constituting the gate electrode 531, the gate insulating layer 521, the semiconductor layer 522, the resistance change layer 523, and the conductive pillar 524. The first voltage $V_1$ may be different from the second voltage $V_2$. Alternatively, the first voltage $V_1$ may be the second voltage $V_2$ or greater. Alternatively, the first voltage $V_1$ may be greater than the second voltage $V_2$. A difference between the first voltage $V_1$ and the second voltage $V_2$ may be smaller than an absolute value of the second voltage $V_2$, and the absolute value of the second voltage $V_2$ may be about 5 V or less.

In the resistance change layer 523a corresponding to the selection memory cell 710, an electric field $E_1$ in the horizontal direction may be generated by the first voltage $V_1$, the second voltage $V_2$, and the turn-off voltage Voff, and an electric field $E_2$ in the vertical direction may be generated by the second voltage $V_2$. An intensity and a direction of the vertical electric field $E_2$ may be determined by the second voltage $V_2$, and a direction and an intensity of the horizontal electric field $E_1$ may be determined by the turn-off voltage Voff, the first voltage $V_1$, and the second voltage $V_2$. The turn-off voltage Voff, the first voltage $V_1$, and the second voltage $V_2$ may be set such that the horizontal electric field $E_1$ is headed from the conductive pillar 524 to the semiconductor layer 522. The turn-off voltage Voff may be a negative voltage, and the first voltage $V_1$ and the second voltage $V_2$ may be positive voltages. For example, when the first voltage $V_1$ is equal to or greater than the second voltage $V_2$, the intensity of the electric field $E_1$ in the horizontal direction may be stronger.

Oxygen vacancies in the resistance change layer 523a corresponding to the selection memory cell 710 may be concentrated in an interface between the semiconductor layer 522a and the resistance change layer 523a by the horizontal electric field $E_1$ and the vertical electric field $E_2$, and the density of oxygen vacancies may increase in the interface between the semiconductor layer 522a and the resistance change layer 523a. Thus, a conductive filament may be easily formed at an interface between the semiconductor layer 522a and the resistance change layer 523a. The conductive filament changes the resistance change layer 523a to a low resistance state such that a current by the second voltage $V_2$ flows through the resistance change layer 523a, and thus the selection memory cell 710 may perform a write operation.

As described above, the resistance change layer 523a of the selection memory cell 710 according to an embodiment includes an electric field $E_1$ in the horizontal direction and an electric field $E_2$ in the vertical direction, which are formed therein, to cause oxygen vacancies to be concentrated in a specific area, that is, an interface between the semiconductor layer 522a and the resistance change layer 523a, so that a write operation may be easily performed even when the second voltage $V_2$ is small. In addition, the intensity of the electric field $E_1$ in the horizontal direction may be easily adjusted by adjusting the turn-off voltage Voff, the first voltage $V_1$, and the second voltage $V_2$. For example, since the first voltage $V_1$ and the second voltage $V_2$ may be independently applied through the second bit line 552 and the first bit line 551, it is easy to adjust the first voltage $V_1$ and the second voltage $V_2$ by considering the physical properties of the semiconductor layer 522 and the resistance change layer 523.

Figure 6A:
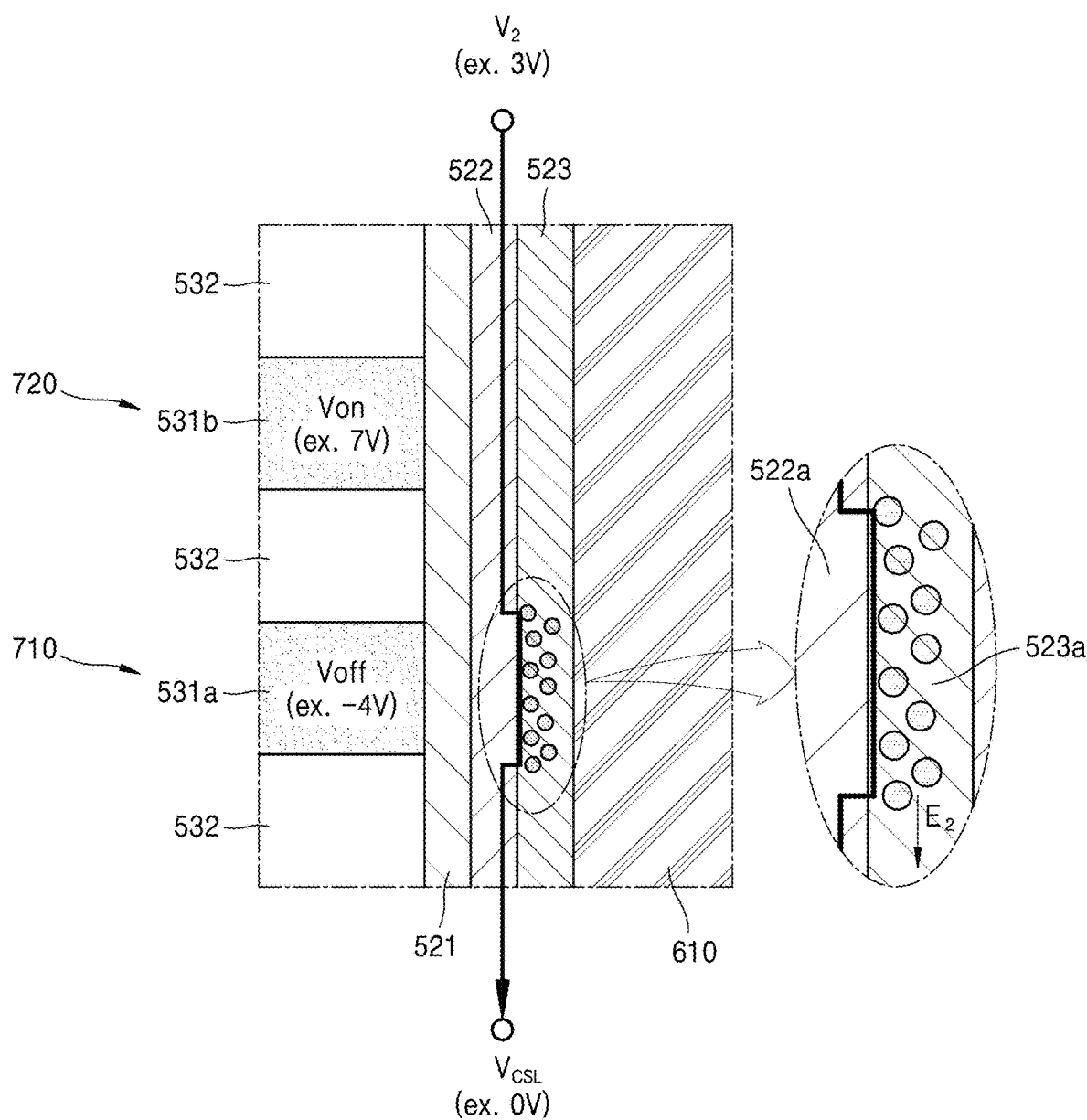
FIGS. 6A and 6B are views showing movement of oxygen pores in a resistance change layer of a semiconductor device without a conductive film in a comparative example.
Figure 6B:
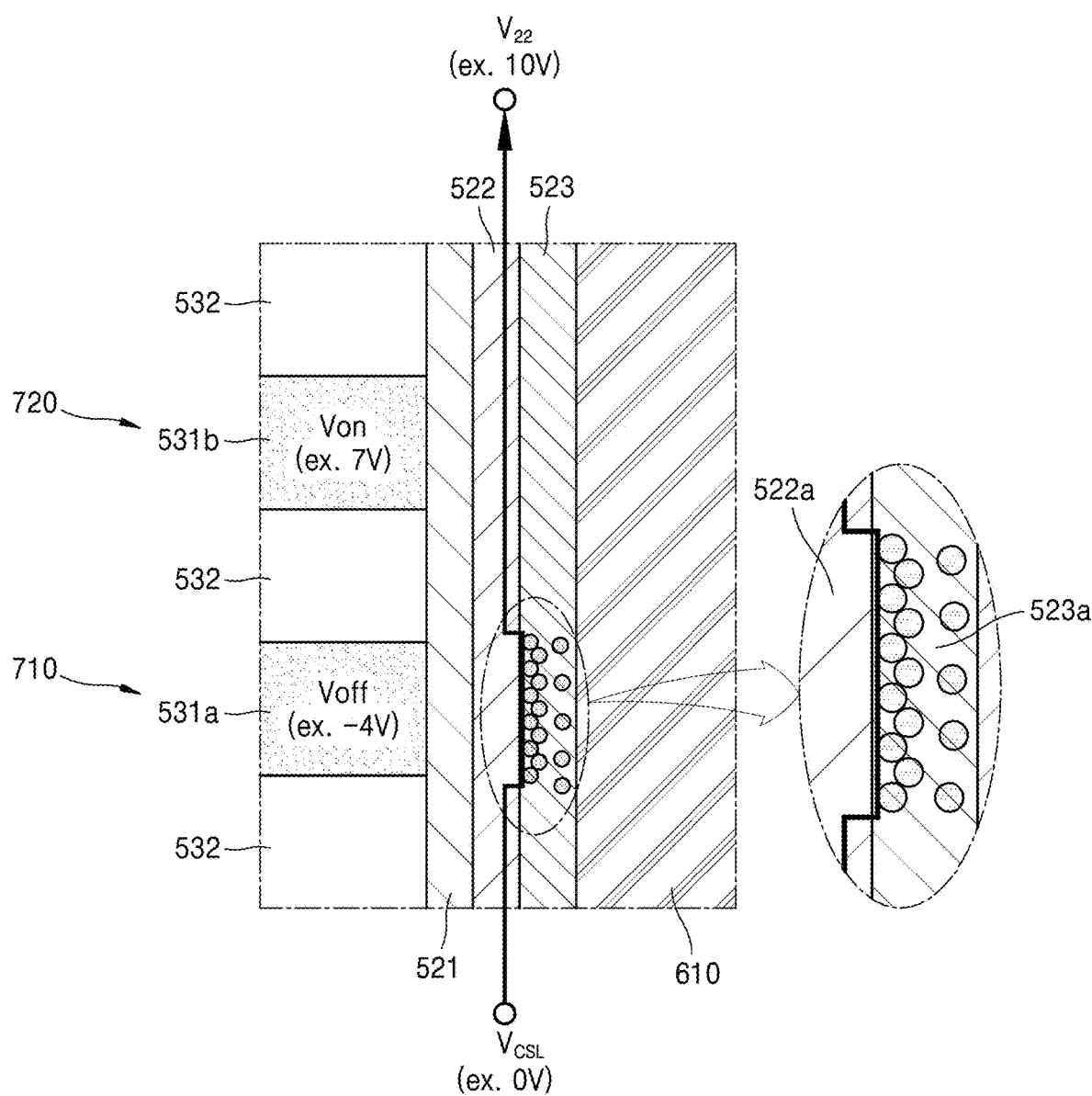

FIGS. 6A and 6B are views related to movement of oxygen pores in a resistance change layer of a semiconductor device without a conductive film in a comparative example.

The cell strings in FIGS. 6A and 6B do not contain a conductive pillar. For example, the cell string may include the gate electrode 531, the insulating element 532, the gate insulating layer 521, the semiconductor layer 522, the resistance change layer 523, and the insulating layer 610 on the substrate 501 (not shown in FIG. 6A but illustrated in FIG. 4). The gate insulating layer 521, the semiconductor layer 522, the resistance change layer 523, and the insulating layer 610 may extend in the first direction. The gate electrodes 531 and the insulating patterns 532 may alternately extend in a second direction perpendicular to the first direction. Only the second bit line 552 for applying a voltage to the semiconductor layer 522 may exist in the cell string.

During a write operation, the memory controller 100 may control to apply a turn-off voltage Voff to the gate electrode 531a of a selection memory cell 710 and a turn-on voltage Von to the gate electrode 531b of a non-selection memory cell 720.

The second voltage $V_2$ may be applied through the second bit line 552 electrically connected to the selection memory cell 710. The electric field $E_2$ in the vertical direction may be formed in the resistance change layer 523a corresponding to the selection memory cell 710. In the resistance change layer 523a corresponding to the selection memory cell 710, oxygen vacancies may only move in the vertical direction and it may be difficult for oxygen vacancies to move in the horizontal direction. As shown in FIG. 6A, the density of oxygen vacancies in the vertical direction is low, and thus conductive filaments may not be formed in the vertical direction.

Meanwhile, in order to form a conductive filament in the vertical direction, a voltage $V_{22}$ greater than the second voltage $V_2$ may be applied to the selection memory cell 710 through the second bit line 552, as illustrated in FIG. 6B. The voltage $V_{22}$ greater than the second voltage may increase the density of oxygen vacancies inside the resistance change layer 523a corresponding to the selection memory cell 710 and may form a conductive filament in the vertical direction. Since the conductive filament causes the resistance change layer 523 to be in a low resistance state, a current may flow in the resistance change layer 523a. Therefore, the memory device performs a write operation at a voltage having a large intensity, and it is difficult for the memory device to perform a write operation at a voltage having a small intensity.

The memory device without the conductive pillar 524 may also perform a write operation. However, in order to form a conductive filament in the vertical direction provided in the resistance change layer 523a of the selection memory cell 710, the density of oxygen vacancies should be increased. In order to increase the density of oxygen vacancies, a relatively large operating voltage may have to be applied to the second bit line 552. In general, a write voltage of about 10 V or more may be applied to a semiconductor device without the conductive pillar 524. This may cause deterioration of the semiconductor layer 522 and thus cause malfunction of the semiconductor device.

Meanwhile, the semiconductor device according to an embodiment includes the conductive pillar 524, and a voltage may be independently applied to the conductive pillar 524. A force in the horizontal direction may be generated in the selected memory cell 710 by an electric field between the conductive pillar 524 and the gate electrode 531a of the selected memory cell 710. The force may cause the oxygen vacancies to be concentrated in an interface between the semiconductor layer 522 and the resistance change layer 523. Thus, even if the absolute value of the second voltage applied to the semiconductor layer 522 corresponding to the selection memory cell 710 is small, the conductive filament may be easily formed. In addition, since the absolute value of the second voltage is small, it is possible to limit and/or prevent the semiconductor layer 522 from deteriorating.

Figure 7:
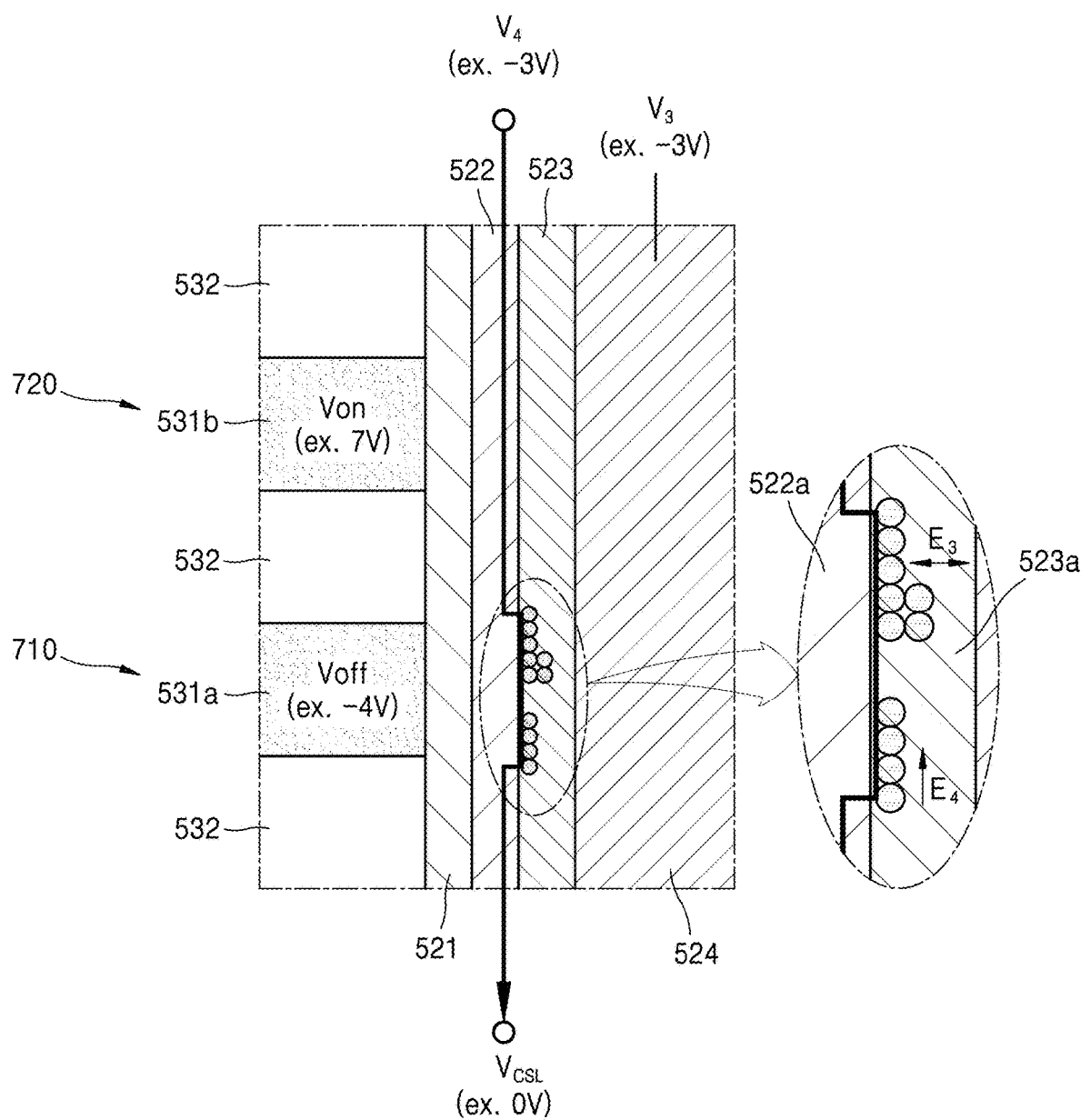
FIG. 7 is a view showing movement of oxygen vacancies in a resistance change layer during an erasure operation according to an embodiment.

FIG. 7 is a view related to movement of oxygen vacancies in a resistance change layer during an erasure operation according to an embodiment.

The memory controller 100 (see FIG. 1) may control to apply a turn-off voltage Voff to the gate electrode 531a of a selection memory cell 710 and a turn-on voltage Von to the gate electrode 531b of a non-selection memory cell 720. Thus, the semiconductor layer 522a corresponding to the gate electrode 531a of the selection memory cell 710 may have insulation characteristics, and the semiconductor layer 522 corresponding to the gate electrode 531b of the non-selection memory cell 720 may have conductor characteristics.

During an erase operation, the memory controller 100 may apply a third voltage $V_3$ to the conductive pillar 524 through the second bit line 552, and a fourth voltage $V_4$ to the semiconductor layer 522 through the first bit line 551. The memory controller 100 may sequentially apply the third voltage $V_3$ and the fourth voltage $V_4$ one after the other or simultaneously.

The third voltage $V_3$ and the fourth voltage $V_4$ may vary depending on the types and thicknesses of materials constituting the gate electrode 531, the gate insulating layer 521, the semiconductor layer 522, the resistance change layer 523, and the conductive pillar 524. For example, the fourth voltage $V_4$ may have the same absolute value as the second voltage $V_2$ and may have opposite signs thereto. When the second voltage $V_2$ is +3 V, the fourth voltage $V_4$ may be −3 V. A difference between the third voltage $V_3$ and the fourth voltage $V_4$ may be smaller than an absolute value of the fourth voltage $V_4$, and the absolute value of the fourth voltage $V_4$ may be about 5 V or less.

The third voltage $V_3$ may be equal to or different from the fourth voltage $V_4$. For example, the third voltage $V_3$ may be equal to or greater than the fourth voltage $V_4$. A difference between the third voltage $V_3$ and the fourth voltage $V_4$ may be equal to a difference between the first voltage $V_1$ and the second voltage $V_2$.

When the third voltage $V_3$ is applied to the conductive pillar 524 and the fourth voltage $V_4$ is applied to the semiconductor layer 522, an electric field $E_3$ in the horizontal direction may be generated by the third voltage $V_3$, the fourth voltage $V_4$, and the turn-off voltage Voff in the resistance change layer 523a corresponding to the selection memory cell 710, and an electric field $E_4$ in the vertical direction may be generated by the fourth voltage $V_4$.

A direction with respect to the electric field $E_4$ in the vertical direction during the erase operation may be opposite to a direction with respect to the electric field $E_2$ in the vertical direction during the write operation.

A direction with respect to the electric field $E_3$ in the horizontal direction during the erase operation may be equal to or different from a direction with respect to the electric field $E_1$ in the horizontal direction during the write operation. For example, if the turn-off voltage Voff and the fourth voltage $V_4$ are negative and the third voltage $V_3$ is greater than or equal to the fourth voltage $V_4$, the direction to the horizontal electric field $E_3$ during the erase operation may be the same as the direction to the horizontal electric field $E_1$ during the write operation. However, the intensity of the electric field $E_3$ in the horizontal direction during the erase operation may be smaller than that of the electric field $E_1$ in the horizontal direction during the write operation. Thus, in the oxygen vacancies during the erase operation, a force according to the electric field $E_3$ in the horizontal direction may be applied to the conductive pillar 524 from the semiconductor layer 522 than in the oxygen vacancies during the write operation. Alternatively, when the third voltage $V_3$ is less than the fourth voltage $V_4$, the direction of the horizontal electric field $E_3$ during the erase operation may be different from the direction of the horizontal electric field $E_1$ during the write operation. Thus, a force according to the electric field $E_3$ in the horizontal direction may be applied to the oxygen vacancies from the semiconductor layer 522 toward the conductive pillar 524.

In the erase operation, the oxygen vacancies in the resistance change layer 523a may move in a direction different from the movement direction in the write operation by the horizontal electric field $E_3$ and the vertical electric field $E_4$. Thus, as the formed conductive filament is cut off, the selection memory cell 710 may perform an erase operation.

In the erase operation, the horizontal electric field $E_3$ and the vertical electric field $E_4$ are formed in the resistance change layer 523a of the selection memory cell 710, so that the conductive filament may be easily cut off by varying the moving direction of the oxygen vacancies. Thus, the magnitude of the fourth voltage $V_4$ applied to the semiconductor layer 522 may be reduced. In addition, since the third voltage $V_3$ and the fourth voltage $V_4$ are independently applied to the conductive pillar 524 and the semiconductor layer 522, it is easy to adjust the third voltage $V_3$ and the fourth voltage $V_4$ in consideration of the physical properties of the memory device.

Figure 8:
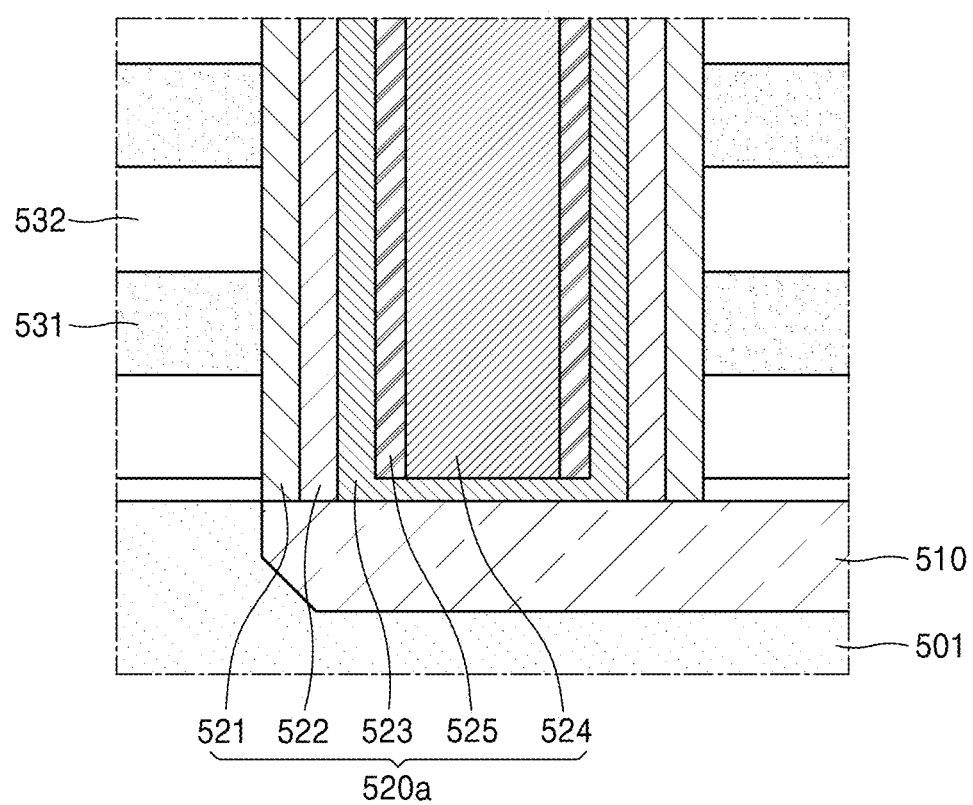
FIG. 8 is a view illustrating a memory device including a first insulating layer according to an embodiment.

FIG. 8 is a view illustrating a memory device including a first insulating layer 525 according to an embodiment. When comparing FIGS. 4 and 8 with each other, the memory device of FIG. 8 may have a channel structure 520a that further includes a first insulating layer 525 between the resistance change layer 523 and the conductive pillar 524. The first insulating layer 525 may surround a side surface and a lower surface of the conductive pillar 524.

The first insulating layer 525 may be formed of an insulating material. For example, the first insulating layer 525 may include silicon oxide. After the resistance change layer 523 is formed, the first insulating layer 525 may be conformally deposited inside the resistance change layer 523. The first insulating layer 525 may limit and/or prevent oxygen vacancies from moving in the resistance change layer 523 due to a potential difference between the conductive pillar 524 and the semiconductor layer 522. In addition, the first insulating layer 525 may limit and/or prevent the resistance change layer 523 from being permanently broken down by the potential difference between the conductive pillar 524 and the gate electrode 531.

Figure 9:
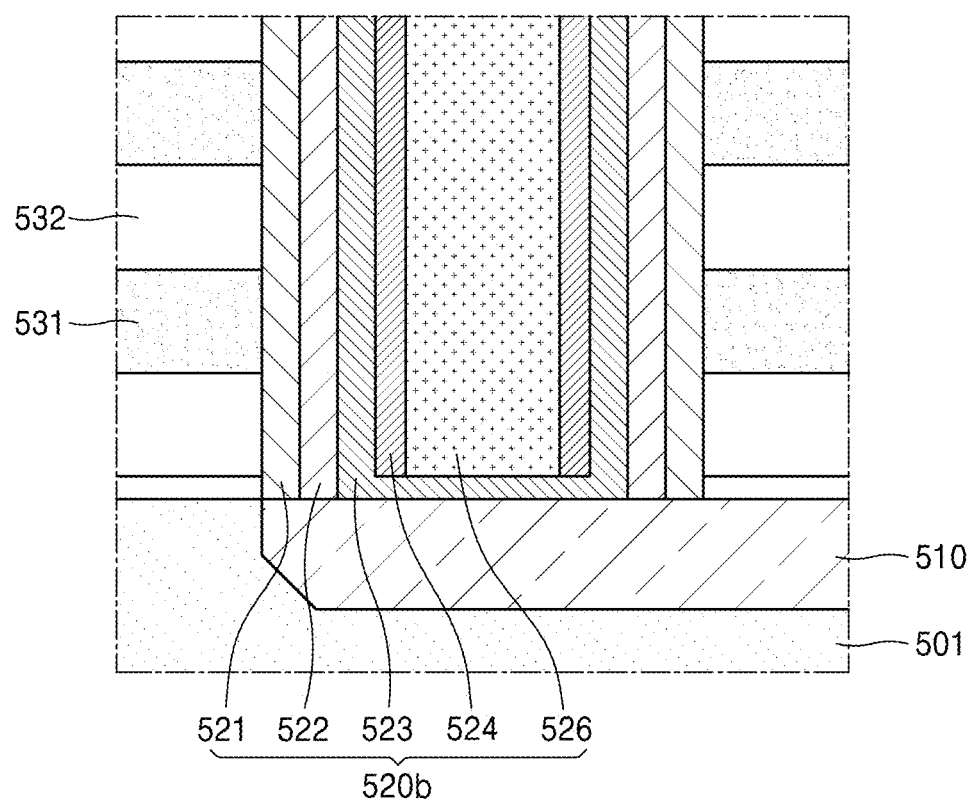
FIG. 9 is a view illustrating a memory device including a second insulating layer according to an embodiment.

FIG. 9 is a view illustrating a memory device including a second insulating layer 526 according to an embodiment. When comparing FIGS. 4 and 9 with each other, the memory device of FIG. 9 may have a channel structure 520b that further includes a second insulating layer 526 embedded in the conductive pillar 524. The second insulating layer 526 may be arranged on an inner wall surface of the conductive pillar 524. The bottom surface of the second insulating layer 526 may be in contact with the resistance change layer 523.

After the conductive pillar 524 is formed, the second insulating layer 526 may be conformally deposited inside the conductive pillar 524.

The second insulating layer 526 may be formed of an insulating material. For example, the second insulating layer 526 may include silicon oxide. The second insulating layer 526 may reduce the contact area between the conductive pillar 524 and the resistance change layer 523, especially the regions arranged on the common source region 510 among the resistance change layer 523. The second insulating layer 526 may limit and/or prevent the oxygen vacancies from moving to the resistance change layer 523 due to a potential difference between the conductive pillar 524 and the common source region 510, and may limit and/or prevent the resistance change layer 523 from being permanently broken down due to a potential difference between the conductive pillar 524 and the common source region 510.

Figure 10:
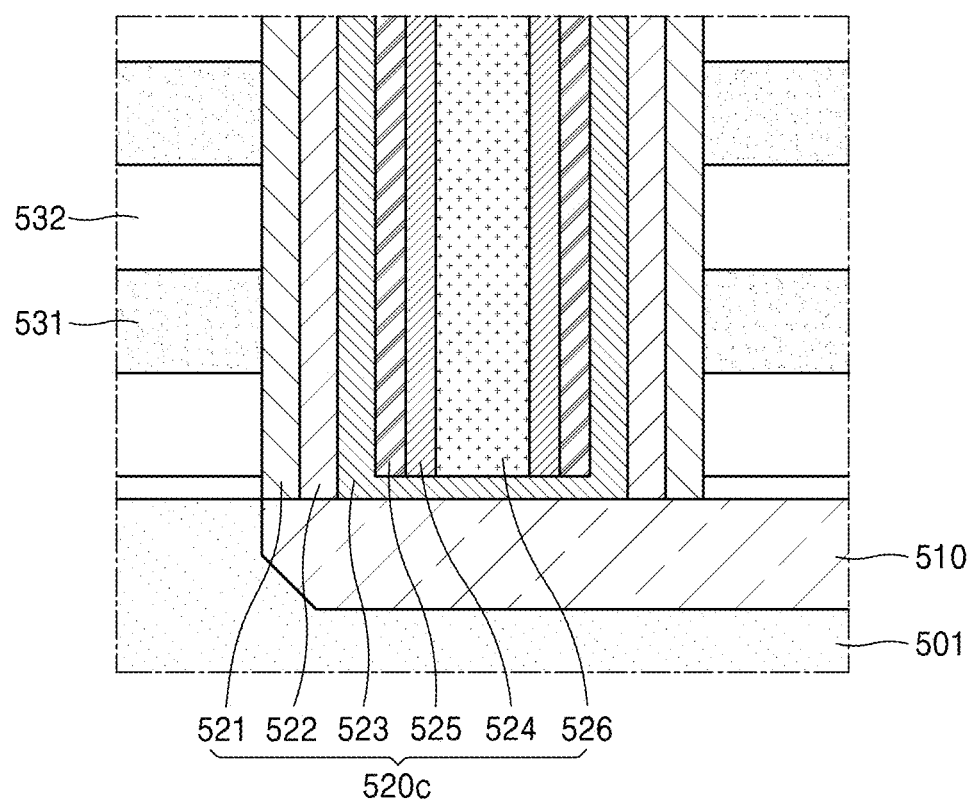
FIG. 10 is a view illustrating a semiconductor device including first and second insulating layers according to an embodiment.

FIG. 10 is a view illustrating a semiconductor device including first and second insulating layers according to an embodiment. When comparing FIGS. 4 and 10 with each other, the semiconductor device of FIG. 10 may have a channel structure 520c that further includes a first insulating layer 525 and a second insulating layer 526 embedded in the conductive pillar 524 between the resistance change layer 523 and the conductive pillar 524. The characteristics of the first insulating layer 525 and the second insulating layer 526 have been described above, and thus a detailed description thereof will be omitted. The semiconductor device in FIG. 10 may be a memory device.

FIGS. 11A to 11G and 12 are reference views illustrating a method of manufacturing a nonvolatile memory device according to an embodiment.

As illustrated in FIG. 11A, first insulating material layers 810 and second insulating material layers 820 may be alternately stacked on the substrate 501. The first insulating material layers 810 and the second insulating material layers 820 may be alternately stacked in a direction perpendicular to the surface of the substrate 501. The first and second insulating material layers 810 and 820 may be formed of different materials. The first and second insulating material layers 810 and 820 may include, for example, silicon oxide, silicon nitride, etc., but are not limited thereto.

As illustrated in FIG. 11B, a hole 830 is formed to penetrate the first and second insulating material layers 810 and 820. Here, the hole 830 may be formed to extend in a direction perpendicular to the surface of the substrate 501. The hole 830 may be formed to have a circular cross section. The hole 830 may be formed by anisotropically etching the first insulating material layer 810 and the second insulating material layer 820. The surface of the substrate 501 may be exposed by the hole 830.

As illustrated in FIG. 11C, the gate insulating layer 521, the semiconductor layer 522, the resistance change layer 523, and the conductive pillar 524 may be sequentially formed on the inner wall of the hole 830. The gate insulating layer 521 may be formed to extend in a direction perpendicular to the surface of the substrate 501. The gate insulating layer 521 may be formed on an inner wall of the hole 830 to be in contact with the first and second insulating material layers 810 and 820. The semiconductor layer 522 may be formed to be in contact with an inner side surface of the gate insulating layer 521. The resistance change layer 523 may be formed on an inner side surface of the semiconductor layer 522 and an upper surface of the substrate 501 exposed by the hole 830. A conductive pillar 524 may be further formed in the resistance change layer 523. The conductive pillar 524 is formed in FIG. 11C, but the embodiments are not limited thereto. The conductive pillar 524 may be formed together when a gate electrode 531 to be described later is formed.

As shown in FIG. 11D, an opening 840 penetrating the first and second insulating material layers 810 and 820 (see FIG. 11C) may be formed, and the second insulating material layers 820 may be removed to expose the gate insulating layer 521. The second insulating material layers 820 may be etched by a wet etching process.

As illustrated in FIG. 11E, gate electrodes 531 may be formed in regions from which the second insulating material layers 820 are removed. When the gate electrodes 531 are formed, the conductive pillar 524 may also be formed. The remaining first insulating material layers 810 may be insulating patterns 532. When the gate electrodes 531 are formed, the conductive pillar 524 may also be formed together.

As illustrated in FIG. 11F, a common source region 510 may be formed in the substrate 501 exposed by the opening 840 (see FIG. 11E). The common source region 510 may be formed by doping n-type impurities, such as phosphorus (P).

Figure 12:
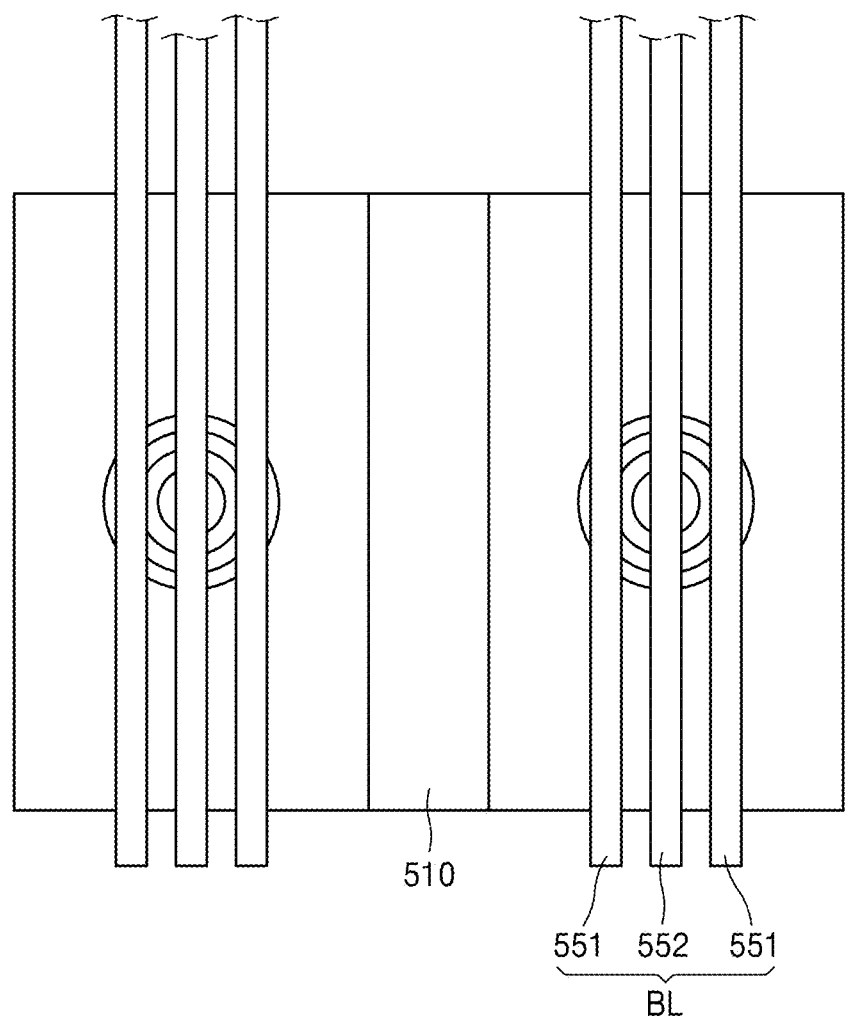
FIG. 12 is a reference view illustrating a method of manufacturing a nonvolatile memory device according to an embodiment.

As shown in FIGS. 11G and 12, a first drain 541 may be formed on the semiconductor layer 522, a second drain 542 may be formed on the conductive pillar 524, and a first bit line 551 and a second bit line 552 respectively contacting the first drain 541 and the second drain 542 may be formed.

Referring to FIGS. 5, 6A, 6B, and 7, for example, the memory device according to an embodiment includes a conductive pillar 524 capable of forming an electric field in a horizontal direction in the resistance change layer 523 of the selection memory cell 710, thereby reducing the absolute value of the voltage applied to the semiconductor layer 522. Since a voltage is independently applied to the conductive pillar 524 and the semiconductor layer 522, the applied voltage may be easily adjusted according to the physical properties of the memory device.

While FIGS. 11C to 11G illustrate the channel structure 520 from FIG. 4, example embodiments are not limited thereto. The channel structures 520a, 520b, and 520c from FIGS. 8, 9, and 10 alternatively may be formed instead of the channel structure 520 illustrated in FIG. 11C to manufacture nonvolatile memory devices including any one of the channel structures 520a, 520b, and 520c illustrated in FIGS. 8, 9, and 10.

Figure 13:
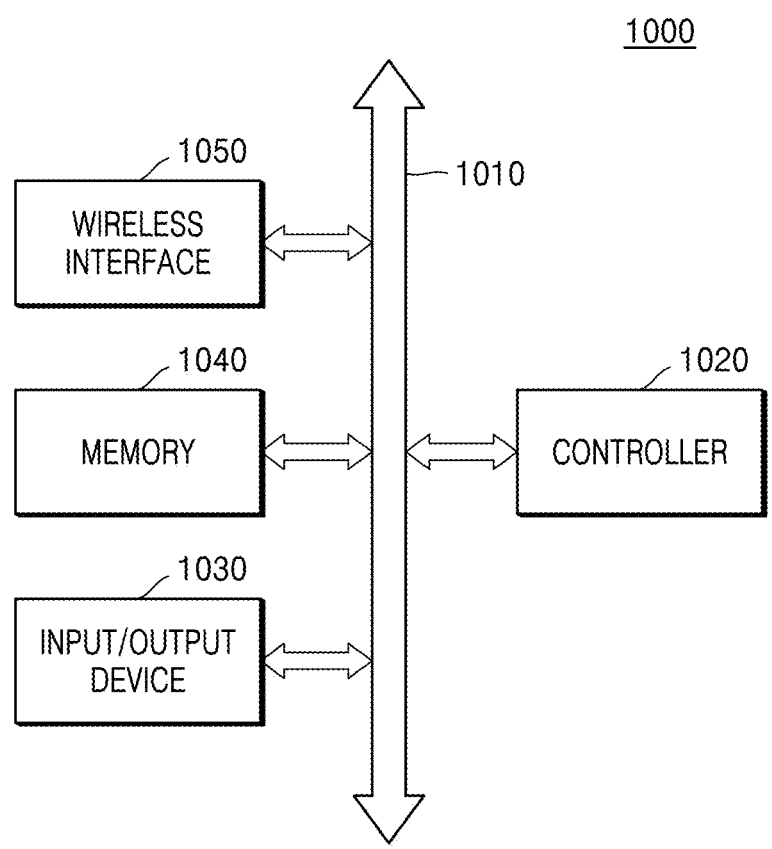
FIG. 13 is a block diagram schematically illustrating an electronic device including a nonvolatile memory device according to an embodiment.

FIG. 13 is a block diagram schematically illustrating an electronic device 1000 including a nonvolatile memory device according to an embodiment.

Referring to FIG. 13, an electronic device 1000 according to an embodiment may be one of a PDA, a laptop computer, a portable computer, a web tablet, a wireless phone, a mobile phone, a digital music player, a wired or wireless electronic device, and a composite electronic device including at least two of them. The electronic device 1000 may include a controller 1020 coupled to each other through a bus 1010, an input/output device 1030, such as a keypad, a keyboard, and a display, a memory 1040, and a wireless interface 1050.

The controller 1020 may include, for example, one or more microprocessors, digital signal processors, microcontrollers, or the like. The memory 1040 may be used, for example, to store an instruction to be executed by the controller 1020.

The memory 1040 may be used to store user data. The memory 1040 may include at least one of nonvolatile memory devices according to an embodiment.

The electronic device 1000 may use a wireless interface 1050 to transmit data to a wireless communication network communicating with an RF signal or to receive data from the network. For example, the wireless interface 1050 may include an antenna, a wireless transceiver, or the like. The electronic device 1000 may be used in communication interface communication protocols, such as third-generation communication systems, such as CDMA, GSM, NADC, E-TDMA, WCDAM, CDMA2000, Wi-Fi, Bluetooth, a wireless universal serial bus (USB), Zigbee, near-field communication (NFC), radio-frequency identification (RFID), a 4th generation (4G) communication system, or long term evolution (LTE), or a 5G (5th Generation) communication system.

Figure 14:
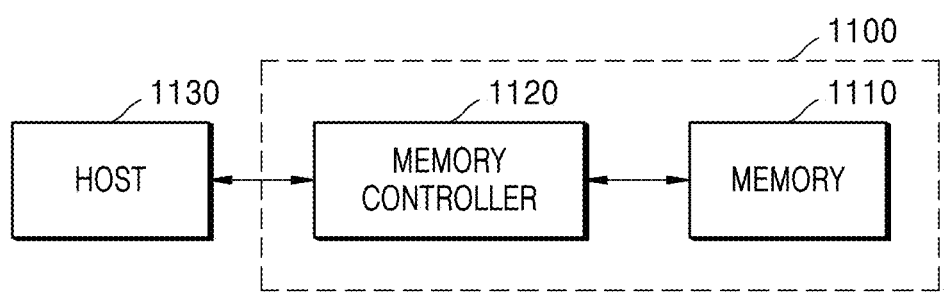
FIG. 14 is a block diagram schematically illustrating a memory system including a nonvolatile memory device according to an embodiment.

FIG. 14 is a block diagram schematically illustrating a memory system 1100 including a nonvolatile memory device according to an embodiment.

Referring to FIG. 14, nonvolatile memory devices according to an embodiment may be used to implement a memory system. The memory system 1100 may include a memory 1110 and a memory controller 1120 for storing a large capacity of data. The memory controller 1120 controls the memory 1110 to read data stored from the memory 1110 or write data in the memory 1110 in response to a read/write request from the host 1130. The memory controller 1120 may configure an address mapping table for mapping an address provided from a host 1130, for example, a mobile device or a computer system, to a physical address of the memory 1110. The memory 1110 may include at least one of semiconductor memory devices according to an embodiment.

Figure 15:
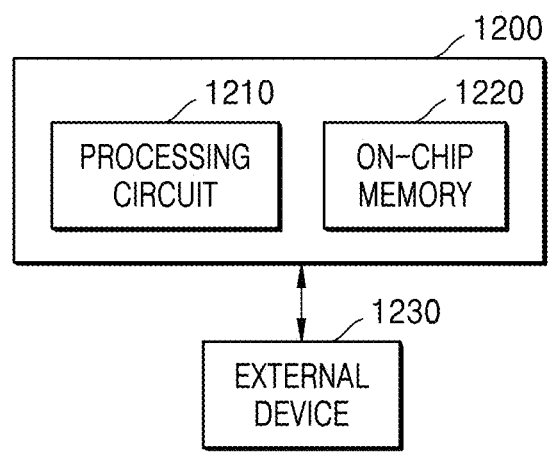
FIG. 15 is a block diagram schematically illustrating a neuromorphic device including a memory device according to an embodiment.

The nonvolatile memory device according to the embodiment described so far may be implemented in the form of a chip and used as a neuromorphic computing platform. For example, FIG. 15 schematically illustrates a neuromorphic device including a memory device according to an embodiment. Referring to FIG. 15, the neuromorphic device 1200 may include a processing circuit 1210 and/or a memory 1220. The memory 1220 of the neuromorphic device 1200 may include a memory system according to an embodiment.

The processing circuit 1210 may be configured to control functions for driving the neuromorphic device 1200. For example, the processing circuit 1210 may control the neuromorphic device 1200 by executing a program stored in the memory 1220 of the neuromorphic device 1200.

The processing circuit 1210 may include hardware such as a logic circuit, a combination of hardware and software such as a processor that executes the software, or a combination thereof. For example, the processor may include a central processing unit (CPU), a graphics processing unit (GPU), an application processor (AP) within a neuromorphic device 1200, an arithmetic logic unit (ALU), a digital processor, a microcomputer, a field programmable gate array (FPGA), a system-on-chip (SoC), a programmable logic unit, a microprocessor, an application-specific Integrated circuit (ASIC), or the like.

In addition, the processing circuit 1210 may read and write various data in the external device 1230 and execute the neuromorphic device 1200 using the data. The external device 1230 may include a sensor array including an external memory and/or an image sensor (e.g., a CMOS image sensor circuit).

The neuromorphic device 1200 shown in FIG. 15 may be applied to a machine learning system. The machine learning system may utilize various artificial neural network organizations and processing models including, for example, a recurrent neural network (RNN), a stacked neural network (SNN), a state-space dynamic neural network (SSDNN), a deep belief network (DBN), generative adversarial networks (GANs), and/or restricted Boltzmann machines (RBM), or the like, which selectively include a convolutional neural network (CNN), a deconvolutional neural network, a long short-term memory (LSTM), and/or a gated recurrent unit (GRU).

Such machine learning systems may include, for example, linear regression and/or logistic regression, statistical clustering, Bayesian classification, decision trees, dimensional reduction such as principal component analysis, and other types of machine learning models such as expert systems, and/or ensemble techniques such as random forest, and a combination thereof. These machine learning models may be used to provide various services, such as image classification services, biometric information or biometric data based authentication services, advanced driver assistance systems (ADAS), voice assistant services, and automatic speech recognition (ASR) services, and may be mounted and executed on other electronic devices.

The semiconductor device according to an embodiment includes the conductive pillar capable of forming the electric field in the horizontal direction in the resistance change layer of the selection memory cell, thereby reducing the absolute value of the voltage applied to the semiconductor layer.

Since a voltage is independently applied to the conductive pillar and the semiconductor layer, a voltage range may be easily adjusted according to physical properties of the semiconductor device.

One or more of the elements disclosed above may include or be implemented in processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:
1. A nonvolatile memory device comprising:
a conductive pillar;
a resistance change layer surrounding a side surface of the conductive pillar;
a semiconductor layer surrounding a side surface of the resistance change layer;
a gate insulating layer surrounding a side surface of the semiconductor layer;
a plurality of insulating patterns and a plurality of gate electrodes, the plurality of insulating patterns and the plurality of gate electrodes being alternately arranged along a surface of the gate insulating layer, and the plurality of insulating patterns and the plurality of gate electrodes surrounding a side surface of the gate insulating layer;
a second bit line electrically connected to the conductive pillar, the second bit line being configured to provide a first voltage to the conductive pillar; and
a first bit line electrically insulated from the second bit line, the first bit line being electrically connected to the semiconductor layer, and the first bit line being configured to provide a second voltage to the semiconductor layer.

2. The nonvolatile memory device of claim 1, wherein the first voltage and the second voltage are different from each other.

3. The nonvolatile memory device of claim 1, wherein the first voltage is greater than the second voltage.

4. The nonvolatile memory device of claim 1, wherein a difference between the first voltage and the second voltage is less than an absolute value of the second voltage.

5. The nonvolatile memory device of claim 1, wherein an absolute value of the second voltage is about 5 V or less.

6. The nonvolatile memory device of claim 1, further comprising:
a controller, wherein
the controller is configured to apply a turn-off voltage to a gate electrode corresponding to a selection memory cell in the plurality of gate electrodes, and
the controller is configured to apply a turn-on voltage to a gate electrode corresponding to a non-selection memory cell in the plurality of gate electrodes.

7. The nonvolatile memory device of claim 6, wherein the turn-off voltage is less than at least one of the first voltage and the second voltage.

8. The nonvolatile memory device of claim 6, wherein the turn-on voltage is greater than at least one of the first voltage and the second voltage.

9. The nonvolatile memory device of claim 6, wherein a difference between the first voltage and the second voltage is less than a difference between the turn-on voltage and the turn-off voltage.

10. The nonvolatile memory device of claim 1, wherein all regions of the conductive pillar are spatially spaced apart from all regions of the semiconductor layer.

11. The nonvolatile memory device of claim 1, further comprising:
an insulating layer between the resistance change layer and the conductive pillar.

12. The nonvolatile memory device of claim 1, further comprising:
an insulating layer in the conductive pillar.

13. The nonvolatile memory device of claim 12, wherein the insulating layer in the conductive pillar is in contact with the resistance change layer.

14. An operating method of a nonvolatile memory device, the nonvolatile memory device including a conductive pillar and a memory cell array along a side of the conductive pillar, the operating method comprising:
applying a turn-off voltage to a selection memory cell in the memory cell array;
applying a turn-on voltage to a non-selection memory cell in the memory cell array; and
during an operation on the selection memory cell, applying a first voltage to the conductive pillar and applying a second voltage to the memory cell array, the second voltage being different from the first voltage, wherein
a difference between the first voltage and the second voltage is less than an absolute value of the second voltage.

15. The operating method of claim 14, wherein the first voltage is greater than the second voltage.

16. The operating method of claim 14, wherein the difference between the first voltage and the second voltage is less than a difference between the turn-on voltage and the turn-off voltage.

17. The operating method of claim 14, wherein the absolute value of the second voltage is about 5 V or less.

18. The operating method of claim 14, wherein the turn-off voltage is less than at least one of the first voltage and the second voltage.

19. The operating method of claim 14, wherein the turn-on voltage is greater than at least one of the first voltage and the second voltage.

20. An operating method of a nonvolatile memory device, the nonvolatile memory device including a conductive pillar and a memory cell array along a side of the conductive pillar, the operating method comprising:
- applying a turn-off voltage to a selection memory cell in the memory cell array;
- applying a turn-on voltage to a non-selection memory cell in the memory cell array; and
- during an operation on the selection memory cell, applying a first voltage to the conductive pillar and applying a second voltage to the memory cell array, the second voltage being different from the first voltage,
- wherein a difference between the first voltage and the second voltage is less than a difference between the turn-on voltage and the turn-off voltage.

* * * * *